(12) United States Patent
Saito

(10) Patent No.: US 8,960,080 B2
(45) Date of Patent: Feb. 24, 2015

(54) FOAMING NOZZLE

(75) Inventor: Shojiro Saito, Tokyo (JP)

(73) Assignee: SS&W Japan, Tokyo (JP)

( * ) Notice: Subject to any disclaimer, the term of this patent is extended or adjusted under 35 U.S.C. 154(b) by 921 days.

(21) Appl. No.: 13/127,751

(22) PCT Filed: Aug. 27, 2009

(86) PCT No.: PCT/JP2009/064936
§ 371 (c)(1),
(2), (4) Date: Jun. 22, 2011

(87) PCT Pub. No.: WO2010/052966
PCT Pub. Date: May 14, 2010

(65) Prior Publication Data
US 2011/0239872 A1   Oct. 6, 2011

(30) Foreign Application Priority Data
Nov. 6, 2008   (JP) .................. 2008-285721

(51) Int. Cl.
*A47J 31/44* (2006.01)
*A47J 43/12* (2006.01)

(52) U.S. Cl.
CPC ............ *A47J 31/4489* (2013.01); *Y10S 261/16* (2013.01); *Y10S 261/76* (2013.01)
USPC ......... 99/323.1; 99/293; 366/101; 366/137.1; 261/DIG. 16; 261/DIG. 76

(58) Field of Classification Search
USPC .......... 99/323.1, 293; 366/101, 137.1, 165.1; 261/DIG. 16, DIG. 76, 121.1; 239/552, 239/553.5, 590.5, 601, 599, 597
See application file for complete search history.

(56) References Cited

U.S. PATENT DOCUMENTS

| 2,425,709 | A | * | 8/1947 | Bucknam et al. | 239/424 |
| 2,613,112 | A | * | 10/1952 | Fletcher | 239/430 |
| 3,338,570 | A | * | 8/1967 | Zimmer | 239/132.3 |
| 4,824,017 | A | * | 4/1989 | Mansfield | 239/9 |
| 5,080,286 | A | * | 1/1992 | Morrison | 239/533.13 |
| 5,614,130 | A | | 3/1997 | Müller et al. | |

(Continued)

FOREIGN PATENT DOCUMENTS

| JP | 4-501970 | 4/1992 |
| JP | 6-55519 | 8/1994 |

(Continued)

OTHER PUBLICATIONS

International Search Report issued Dec. 1, 2009 in International (PCT) Application No. PCT/JP2009/064936.

*Primary Examiner* — Reginald L Alexander
(74) *Attorney, Agent, or Firm* — Wenderoth, Lind & Ponack, L.L.P.

(57) ABSTRACT

A foaming nozzle is connected to a gas generating device for generating a high-pressure gas which has a pressure higher than an atmospheric pressure and spouting the high-pressure gas from the tip of the nozzle, and the foaming nozzle foams, while stirring, a liquid located in the direction of the spouting. The foaming nozzle has formed in the tip thereof at least two kinds of spouting holes for spouting the high-pressure gas. At least one kind of spouting hole is formed in a shape different from the shape of the other kind of spouting hole so as to spout the high-pressure gas at a speed different from the speed of the high-pressure gas spouted from the other kind of spouting hole.

10 Claims, 25 Drawing Sheets

(56) References Cited

U.S. PATENT DOCUMENTS

| | | | |
|---|---|---|---|
| 5,785,256 A * | 7/1998 | Mahlich | 239/552 |
| 5,868,323 A * | 2/1999 | Cantor | 239/589 |
| 6,394,369 B2 * | 5/2002 | Goenka et al. | 239/601 |
| 6,443,374 B1 * | 9/2002 | Astachow et al. | 239/533.2 |
| 2005/0259508 A1 | 11/2005 | Rohde | |
| 2007/0145164 A1 * | 6/2007 | Ahmadi et al. | 239/583 |
| 2008/0073452 A1 * | 3/2008 | Kuronita et al. | 239/601 |

FOREIGN PATENT DOCUMENTS

| | | |
|---|---|---|
| JP | 09-010113 | 1/1997 |
| JP | 2004-073442 | 3/2004 |
| JP | 2005-329241 | 12/2005 |
| WO | 90/10411 | 9/1990 |

\* cited by examiner

PRIOR ART

PRIOR ART

PRIOR ART

FOAMING NOZZLE

TECHNICAL FIELD

The present invention relates to a foaming nozzle which blows a high-pressure gas (air) higher than an atmospheric pressure into a liquid, and in particular to an improvement of spouting holes provided at a tip of the foaming nozzle.

BACKGROUND ART

Previously, to generate microscopic bubbles in liquid filled up in a container, a foaming nozzle which spouts a high-pressure gas (air) higher than an atmospheric pressure from the upside into the liquid is generally known. As this kind of the foaming nozzle, a milk-steaming nozzle provided at an espresso making machine is disclosed in Patent Document 1 (Japanese Patent Application Laid-open No. 2004-073442 A).

In general, the espresso making machine forcibly extracts by packing coffee beans deeply roasted and minutely grinded into a cup-type metallic filter, putting the pressure (which is usually about nine atmospheres) higher than one atmosphere (atmospheric pressure), and pressurizing the coffee beans of about one ounce (30 mL) with hot water of about 90-100° C. at the extraction time of 20-30 seconds. Moreover, such the espresso making machine is arranged a steaming-nozzle to blow a high-pressure and high-temperature steam generated in a tank at the behind (or right and left) of on-off valve of the coffee extraction portion. When heating or warming the milk to put in the coffee such as the espresso etc. and the beverages (drinks), the high-temperature steam is spouted from the steaming-nozzle to these liquids, and the above milk and beverages, etc. are heated without using the fire.

FIG. 1 shows a lateral view of a general foaming nozzle 100. In FIG. 1, the foaming nozzle (steaming-nozzle) 100 is connected to a high-pressure gas (steam) generating device (not shown) at the side of the base end (the upside of FIG. 1), and a high-pressure and high-temperature steam generated by the high-pressure gas (steam) generating device is sent to a tip portion through a flow passageway 101 formed in the foaming nozzle 100. Moreover, a chip body 102 is mounted on the tip of the foaming nozzle 100 by a screw connection and so on.

FIG. 2 shows a bottom view of the chip body 102 of the general foaming nozzle 100. As shown in FIG. 2, a plurality of (in this example, four) spouting holes 103 having the same diameters are provided on the concentric circle at equal intervals on the bottom of the chip body 102. Due to the structure of the chip body 102 equipping a plurality of the spouting holes 103, the steam which is sent from the high-pressure gas (steam) generating device through the flow passageway 101 is in radial spouted from the tip portion of the nozzle 100 downward. The liquid (milk etc.) in the container, arranged in the tip portion of the foaming nozzle 100 downward, is heated by the steam spouted from the spouting holes 103.

The milk foamed by the above steaming-nozzle is, for example, used to cappuccino, café-latte etc. Nowadays, a foaming work (steaming), while heating or warming the milk using the steaming-nozzle, is done by the craftsman named "barista", and the popularity of foam-art (so called as "latté-art" or "coffee-art") putting the patterns based on heart and rosette, etc., while pouring the foamed milk produced by the work (steaming) on the surface of the coffee such as espresso, etc., is growing.

THE LIST OF PRIOR ART DOCUMENT

Patent Document

Patent Document 1: Japanese Patent Application Laid-open No. 2004-73442 A

SUMMARY OF THE INVENTION

Problems to be Solved by the Invention

In general, in the above kind of the steaming-nozzle, the bubbles are formed by generating cavitations in the liquid object (mainly milk) to foaming. The cavitations can be effectively generated by interfering gas (air) with different speed in the liquid.

However, in the general steaming-nozzle shown in FIGS. 1 and 2, it is impossible to generate effectively the cavitations, since the steam spouted from the spouting holes 103 of the chip body 102 has a radially-widespread structure on downward. As a result, there is a problem that it is unable to make fine high-quality bubbles (foamed-milk) which are required in, for example, cappuccino, café-latte, etc., because the size of the bubbles generated in the liquid are inhomogeneous.

FIGS. 3A to 3C are images showing bubble changes when the bubbles are generated by spouting a high-pressure and high-temperature steam into the milk in the container by using the general foaming nozzle; FIG. 3A shows the condition after one minute, FIG. 3B shows the condition after five minutes, and FIG. 3C shows the condition after ten minutes. As shown in FIGS. 3A to 3C, the milk's bubbles generated by using the general foaming nozzle have the mixed of large bubbles and small bubbles. In this way, in a case that sizes of the bubbles are different, since a magnitude relation between the gravitation and the surface tension occurs, it is inclinable that the small bubbles interfere the large bubbles with the lapse of time, the bubbles are combined and then become to one bubble, respectively. More specifically, there is a problem that it is difficult to keep fine bubbles (foamed-milk) for a long time, because the bubble's combines undergo at a short time in case that the bubble sizes are different.

The present invention has been developed in view of the above described circumstances, and an object of the present invention is to provide a foaming nozzle, which allows even unskilled person to easily generate fine sustainable high-quality foam by spouting a high-pressure gas (air, steam) generated by a high-pressure gas generating device to a liquid to be foamed.

Means for Solving the Problems

The present invention relates to a foaming nozzle, the above-described object of the present invention is achieved by said foaming nozzle which is connected to a gas generating device for generating a high-pressure gas which has a pressure higher than an atmospheric pressure, and foams, while stirring, a liquid located in a spouting direction by spouting said high-pressure gas from a tip, wherein; at least two kinds of spouting holes for spouting said high-pressure gas are formed in said tip, at least one kind of said spouting holes is formed in a shape different from a shape of other kind of said discharge holes so as to spout said high-pressure gas at a speed different from a speed of said high-pressure gas spouted from the other kind of said spouting holes, and flows of said high-pressure gas, having different speed, spouted from said spouting holes are adapted to interfere with each other in said liquid.

The above-described object is effectively achieved by that said spouting holes are formed in a bottom of a chip body detachably attached to said tip.

The above-described object is effectively achieved by that a hole cross-section of at least one kind of said spouting holes is a precise circular and a hole cross-section of said other spouting holes are an elongated circular having a larger cross-sectional area than said precise circular.

The above-described object is effectively achieved by that at least one kind of said spouting holes and said other spouting holes are differentially holes which are separated and are formed on a same plane of said tip.

The above-described object is effectively achieved by that at least one kind of said spouting holes and said other spouting holes are connecting holes which are integrally formed on a same plane of said tip.

The above-described object is effectively achieved by that a plurality of working surfaces formed of at least one kind of said spouting holes and said other spouting holes are formed in a side surface of said tip.

The above-described object is effectively achieved by that a plurality of working surfaces formed of at least one kind of said spouting holes and said other spouting holes are regularly formed along circumferential direction in a side surface of said tip, and a spouting direction of said spouting holes formed in said working surfaces is arranged without interference to said high-pressure gas spouted from said spouting holes formed in each other working surfaces.

The above-described object is effectively achieved by that a spouting direction of said spouting holes formed in said working surfaces is arranged in order to slant in a circumferential direction at a predetermined angle relative to each radiation direction.

The above-described object is effectively achieved by that said radiation direction is arranged to slant in a range of 30°-60° relative to a vertical direction, and said predetermined angle is a range of 30°-50°.

The above-described object is effectively achieved by that said spouting holes formed in said working surfaces are formed at 120° intervals along a circumferential direction of said tip.

The above-described object is effectively achieved by that said gas generating device extracts a coffee by applying a pressure higher than an atmospheric pressure and generates a high-temperature steam as said high-pressure gas, and said liquid is a milk foamed and heated by said high-temperature steam.

The above-described object is effectively achieved by that said liquid is a fresh cream foamed by said high-pressure gas.

Effects of the Invention

According to the foaming nozzle of the present invention, it is possible to effectively generate the cavitations in the liquid, because at least two kinds of the spouting holes are formed so as to spout the high-pressure gas spouted from the spouting holes. In this way, the foaming nozzle of the present invention allows even an unskilled person to easily generate fine sustainable high-quality foam.

Further, for example, in a case of producing the foamed-milk by using the high-temperature steam generated by an espresso making machine as the high-pressure gas, because it is possible to reduce the time for foaming and heating the milk and to reduce the water amount with milk, as a result, it is possible to produce the better foamed-milk.

BRIEF DESCRIPTION OF THE DRAWINGS

In the accompanying drawings.

FIG. 3A is the image showing a condition after one minute, FIG. 3B is the image showing a condition after five minutes, and FIG. 3C is the image showing a condition after ten minutes;

FIG. 7A is the image showing a condition after one minute, FIG. 7B is the image showing a condition after five minutes, and FIG. 7C is the image showing a condition after ten minutes;

MODE FOR CARRYING OUT THE INVENTION

The present invention will now be explained in more detail with reference to drawings.

Figure 4:
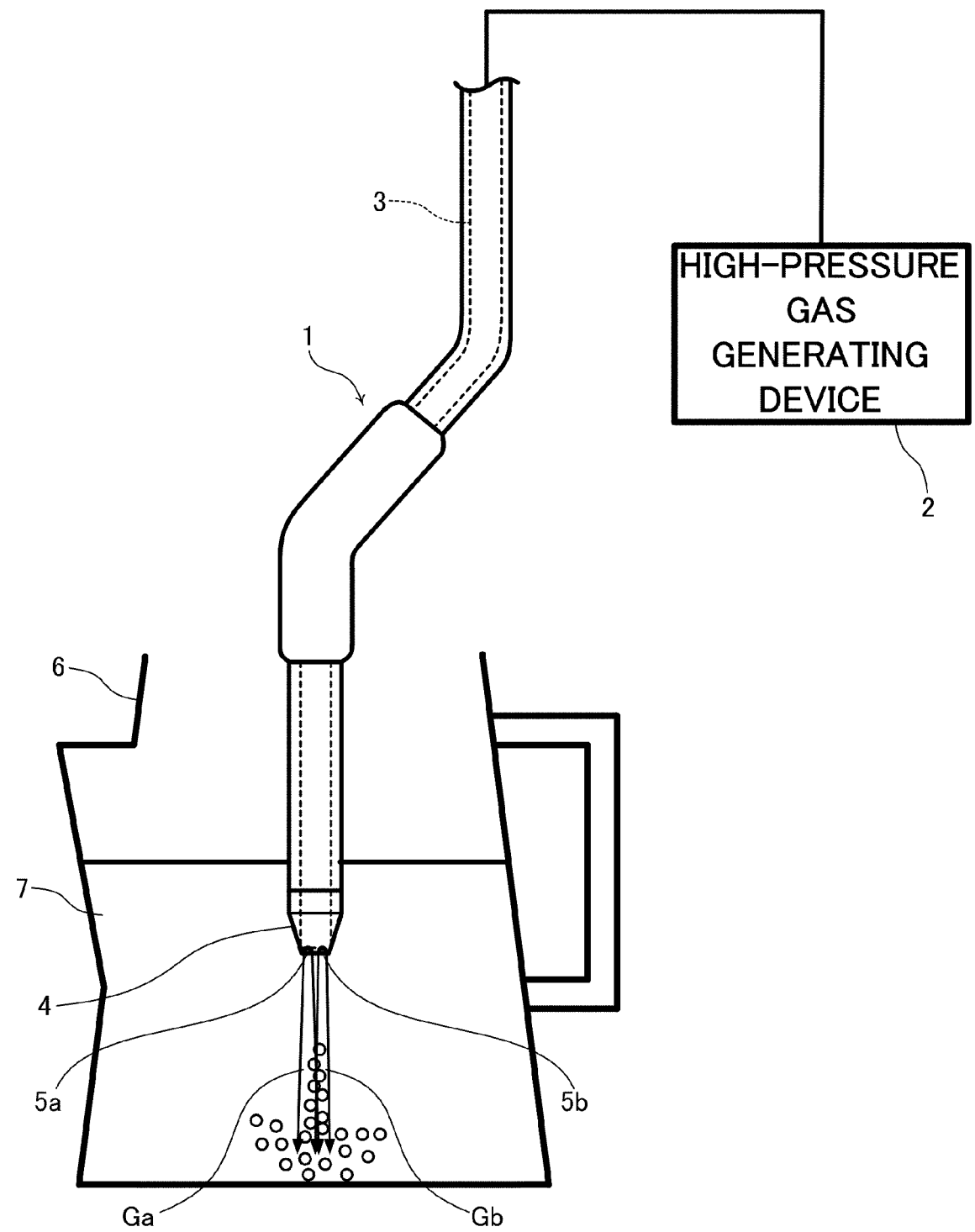
FIG. 4 is a schematic view showing an embodiment of a foaming nozzle according to the present invention.

FIG. 4 is a schematic view showing a foaming nozzle according to the present invention. In FIG. 4, in a side of a base end (upper side of FIG. 4) of a foaming nozzle 1, the foaming nozzle 1 is connected to a high-pressure gas generating device 2 which generates a high-pressure gas (air, steam) higher than an atmospheric pressure, and a flow passageway 3 for the high-pressure gas spouted by the high-pressure gas generating device 2 is formed inside of the foaming nozzle 1. Further, chip bodies 4 are detachably mounted on a tip open part of the foaming nozzle 1 by screw connection means and so on, and spouting holes 5a, 5b being joined with the flow passageway 3 are formed on the bottom of the chip bodies 4. Then, the high-pressure gas generated by the high-pressure gas generating device 2 is sent to the tip through the flow passageway 3 formed in the foaming nozzle 1 and is spouted from the spouting holes 5a, 5b of the chip bodies 4 to liquid 7 filled in a container 6. Spouting angles of the spouting holes 5a, 5b are nearly set in one direction (downward direction).

The container 6, which is filled with the liquid 7, has preferably a circular cross-section. By using the container 6 having this type, a flow of screw or spiral state is generated by the high-pressure gas spouted from the spouting holes 5a, 5b on the liquid 7 in the container 6, minute bubbles generated by the high-pressure gas are carried to the bottom surface of the liquid 7 and then the bubbles are diffused in every detail. As a result, it is possible to stay the bubbles in the whole of the liquid 7.

The high-pressure gas generating device 2 and the liquid 7 for foaming according to the present invention are not particularly restricted, but it will be explained in a case that the high-pressure gas generating device 2 is a coffee extruction machine (espresso making machine) and the liquid 7 is milk used for cappuccino, café-latte, etc. as preferred embodiment of the present invention.

The coffee extraction machine (high-pressure gas generating device) 2 extracts the coffee by pressuring a high-pressure (2-9 atm) higher than the atmospheric pressure as well as comprises a means for generating a high-pressure and high-temperature steam higher than the atmospheric pressure, and the above foaming nozzle 1 is connected to a high-temperature steam generating means of the coffee extraction machine 2 on the side of the base end. In a case producing a foamed-milk by foaming the milk 7 filled in the container (milk pitcher) 6, by carrying out a predetermined input operation to the coffee extraction machine 2, spouting the high-pressure and high-temperature steam from the spouting holes 5a, 5b in the foaming nozzle 1, and foaming, while heating, the milk 7 in the container 6.

Figure 5:
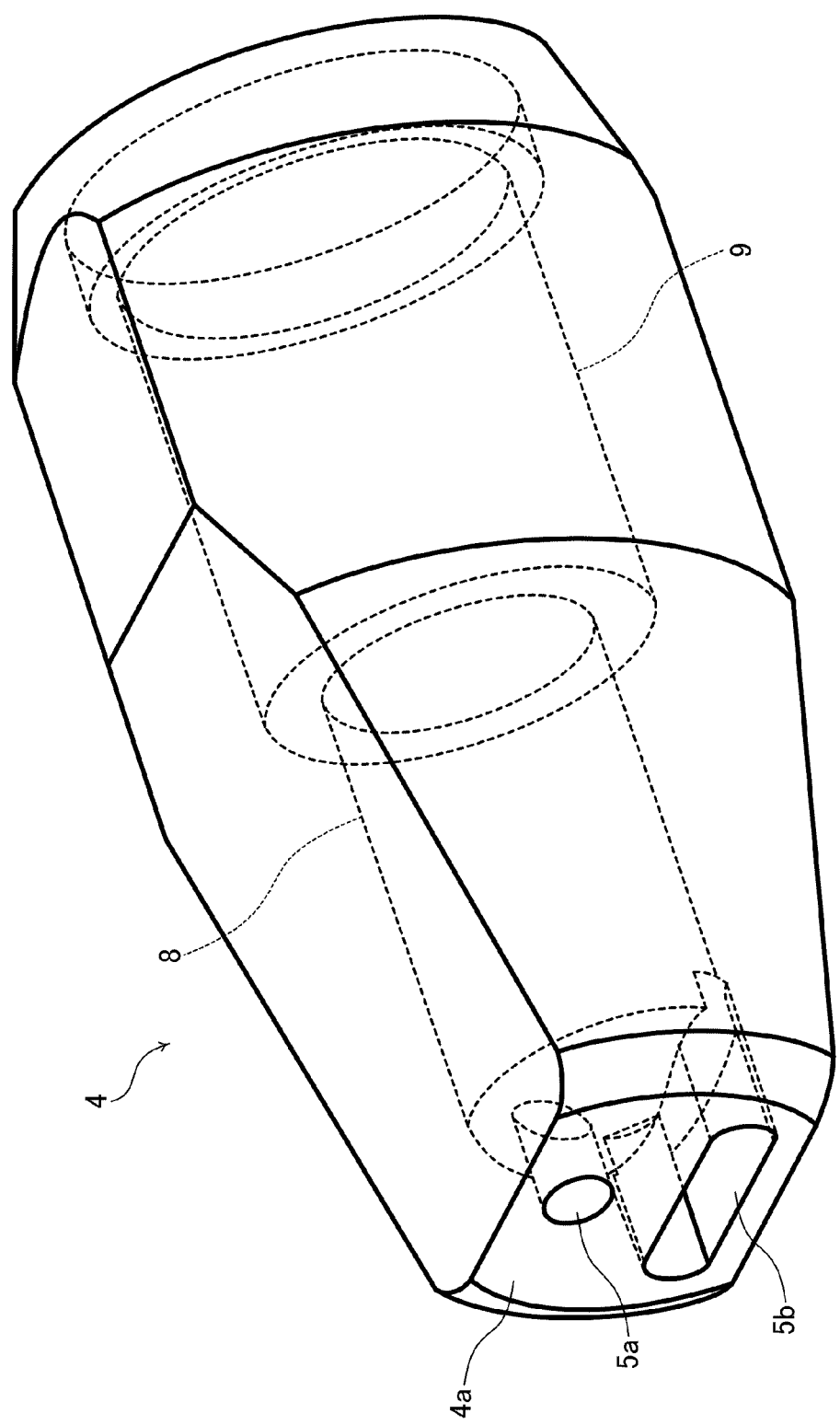
FIG. 5 is a perspective view showing an embodiment of a chip body of the foaming nozzle according to the present invention.
Figure 6A:
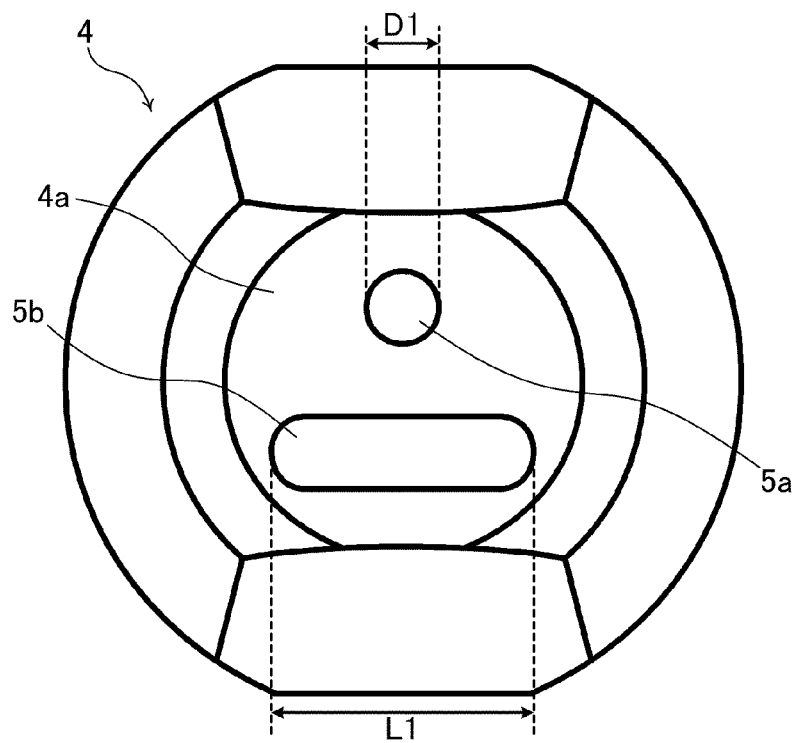
FIG. 6A is a bottom view showing an embodiment of the chip body of the foaming nozzle.
Figure 6B:
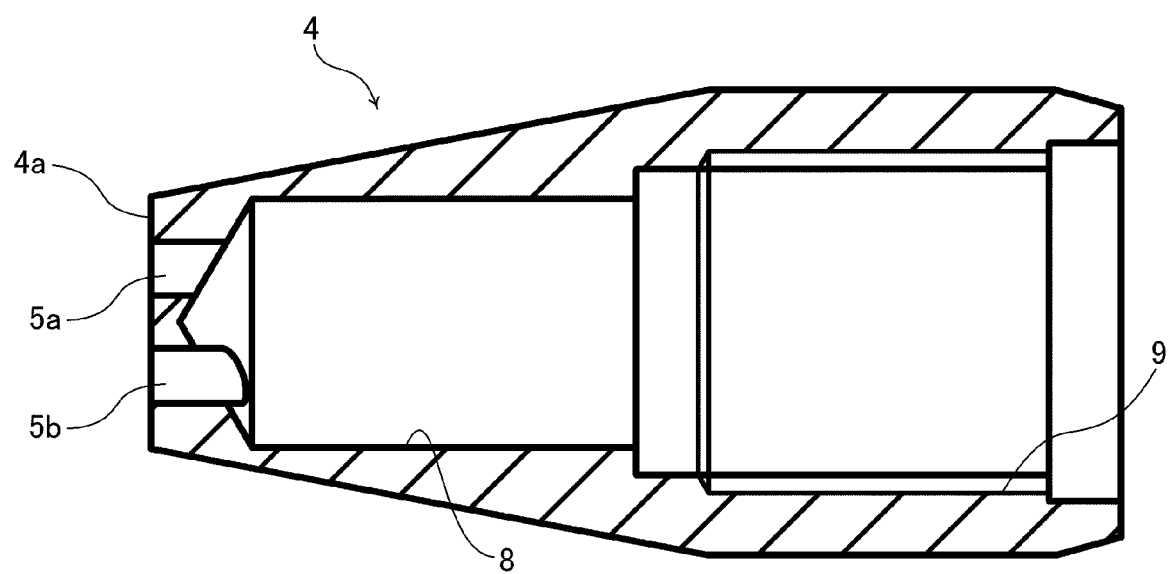
FIG. 6B is a cross-sectional view showing the chip body of the foaming nozzle.

FIG. 5 is a perspective view showing a chip body (chip bodies) of the foaming nozzle 1 according to the present invention, and FIGS. 6A and 6B respectively show a bottom view and a cross-sectional view of the chip body of the foaming nozzle 1 according to the present invention. As shown in FIG. 5, a cyrindrical hollow portion 8 being joined with the flow passageway 3 on fixed in the tip of the foaming nozzle 1 is formed in the chip bodies 4, and a parallel screw portion 9 screwing together a screw groove formed on the tip of the foaming nozzle 1 is mounted on the side of the base end of the cyrindrical hollow portion 8. Therefore, by preparing a plurality of the chip bodies 4 different from the shape type of the spouting holes 5a, 5b, it is possible to arbitrarily change the chip bodies 4 for mounting on the tip of the foaming nozzle 1 in response to the object of foaming and the intended use. In this way, it is possible to easily try to increase the variations, for example of a coffee menu, at a low cost.

Moreover, as shown in FIGS. 6A and 6B, two kind of the spouting holes 5a, 5b having differential hole cross-sectional shapes are respectively separated and formed on the same plane on a bottom portion (a tip portion) 4a of the chip bodies 4, and the spouting holes 5a, 5b are joined with the tip of the cyrindrical hollow portion 8. One in two kind of the spouting holes 5a, 5b, or a hole cross-section of the spouting hole 5a is formed of a precise circular shape, and a hole cross-section of the spouting hole 5b of the other hand is formed of an elongated circular shape whose area is larger than the precise circular shape of the spouting hole 5a. As described above, spouting angles of the spouting holes 5a and 5b are nearly in one direction, and these angles are set up so as to interfere by joining together between a high-pressure gas (high-temperature steam) Ga spouted from the spouting hole 5a and a high-pressure gas (high-temperature steam) Gb spouted from the spouting hole 5b. In this way, on the boundary surface (interference plane) of the high-temperature steams Ga and Gb, a vortex is generated when the high-temperature steam Gb is pulled by the high-temperature steams Ga having a large speed. A cavitation is formed due to a negative pressure generated by the vortex and then a lot of bubbles are formed in the milk.

Figure 1:
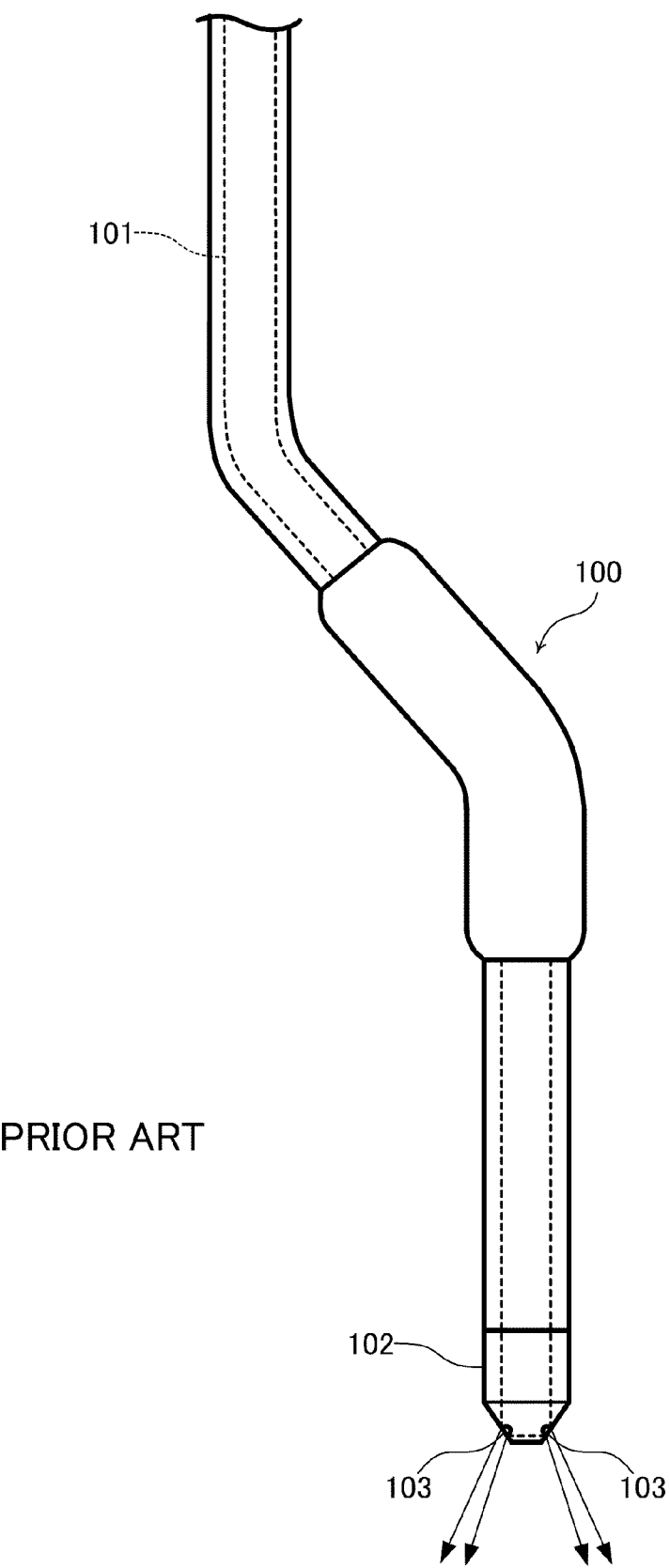
FIG. 1 is a side view showing the general foaming nozzle.
Figure 2:
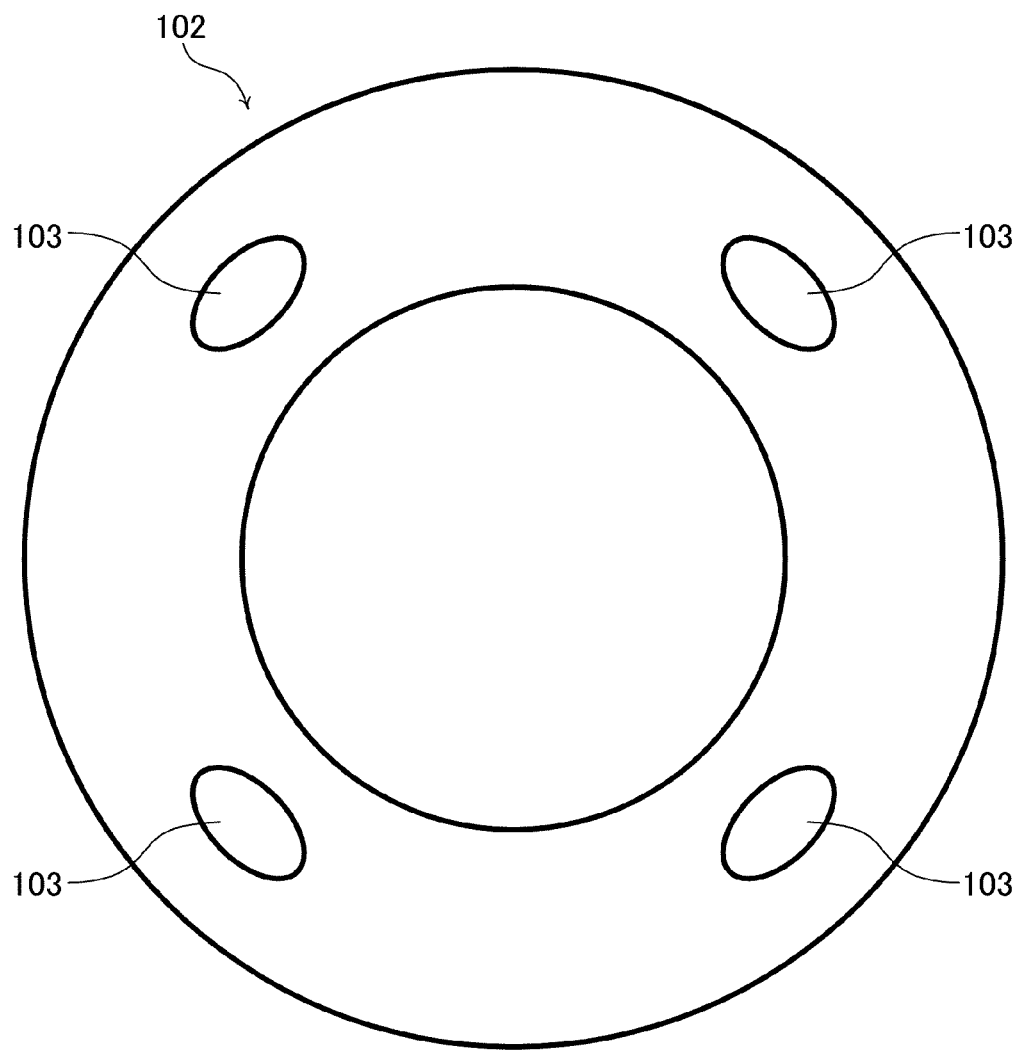
FIG. 2 is a bottom view showing a chip body of the general foaming nozzle.
Figure 3A:
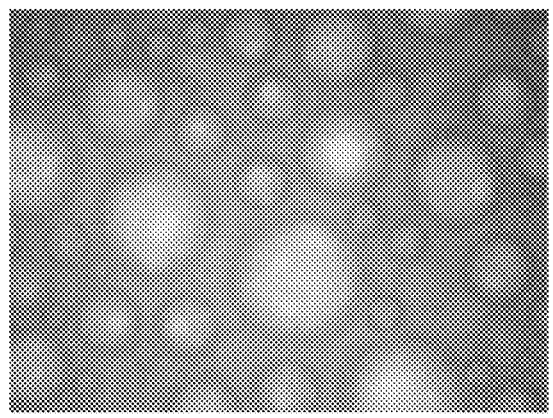
FIGS. 3A to 3C are images showing bubble changes when the bubbles are generated by spouting a high-pressure and high-temperature steam into milk in a container by using the general foaming nozzle.
Figure 3B:
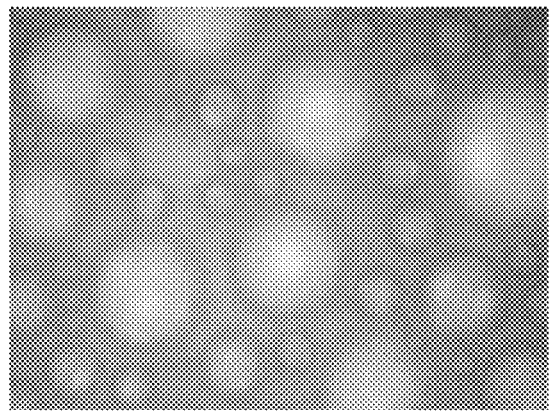
Figure 3C:
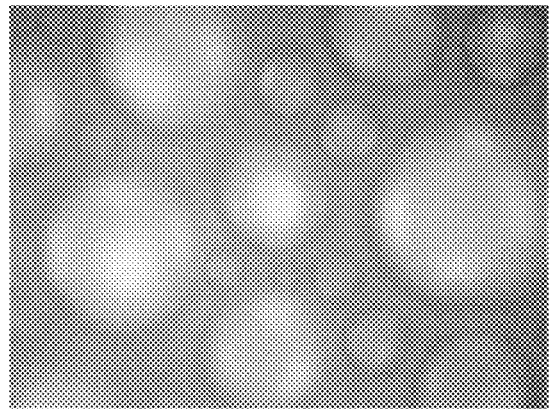
Figure 7A:
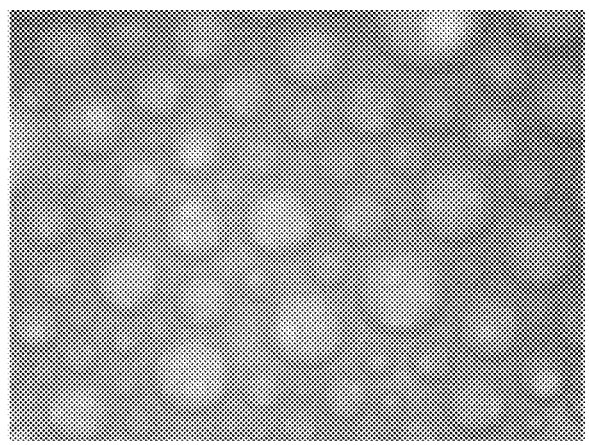
FIGS. 7A to 7C are images showing bubble changes when the bubbles are generated by spouting a high-pressure and high-temperature steam into milk in a container by using the foaming nozzle according to the present invention.
Figure 7B:
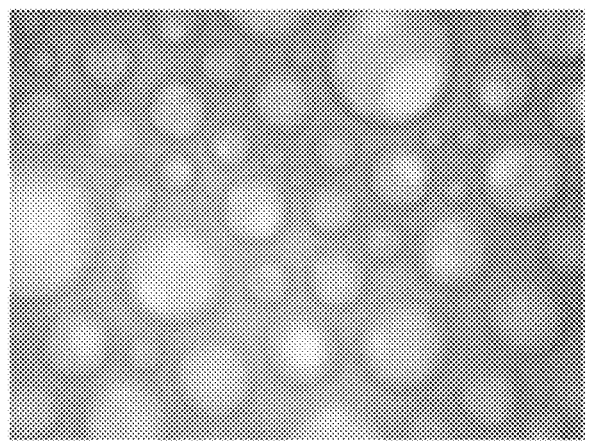
Figure 7C:
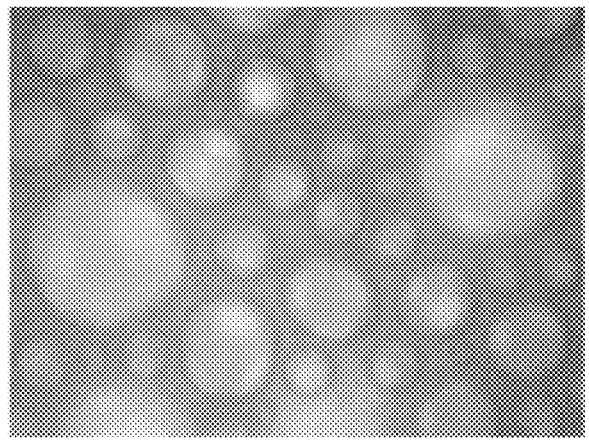

FIGS. 7A to 7C show images of bubble changes when the bubbles are formed by spouting a high-pressure and high-temperature steam into the milk in the container by using the foaming nozzle according to the present invention; FIG. 7A shows a condition after one minute, FIG. 7B shows a condition after five minutes, and FIG. 7C shows a condition after ten minutes. Here, to compare the general example shown in FIG. 1 with the example of FIGS. 7A to 7C, various conditions except the chip body 4 mounted on the foaming nozzle 1 are equally set up with the general example shown in FIG. 1. In a case of comparing the present embodiment of FIG. 7A with the general example of FIG. 3A, it is understood that the bubbles formed by the foaming nozzle 1 of the present embodiment are more minute and smaller than the bubbles formed by the foaming nozzle 100. Moreover, in the images shown in FIGS. 7B and 7C, it is understood that the bubbles formed by the foaming nozzle 1 according to the present embodiment keep having a certain level of the minute bubbles even if a time lapses.

As described above, according to the foaming nozzle 1 of the present invention, it is possible to cause smooth flows of the gas (air) differing in speed by spouting from the spouting holes 5a, 5b to the high-pressure gas (high-temperature steam) Ga, Gb nearly in one direction. Further, it is possible to effectively generate the cavitation by interfering the two flows differing in speed in the objective the liquid (milk) 7. In this way, it is possible to form a lot of minute bubbles at a short time. Moreover, because a boiling point is lowered by generating a negative pressure, it is possible to shorten the spouting time of the high-temperature steams Ga and Gb when foaming, while heating, the milk 7 by the high-temperature steams Ga and Gb. As a result, it is possible to suppress an amount of water mixing in the milk 7.

Moreover, according to the foaming nozzle 1 of the present invention, by forming the hole-section of the spouting hole 5a with a regular circular, forming the hole-section of the spouting hole 5b with an elongated circular, and arranging the regular circular spouting hole 5a on the upper side of the center of a longitudinal direction of the elongated circular spouting hole 5b, it is possible to certainly interfere the high-pressure gas Ga spouted from the regular circular spouting hole 5a to the high-pressure gas Gb spouted from the elongated circular spouting hole 5b. As a result, it is possible to realize the generating of the stable cavitation.

Further, when producing the foamed-milk by foaming the milk 7 with the foaming nozzle 1 according to the present invention, the chip bodies 4 have only to be formed in the tip of a steaming-nozzle mounted on a coffee-extraction machine, such as espresso making machine. Therefore, it is possible to suppress the cost of manufacturing in the minimum.

The hole cross-sectional areas and shapes of the spouting holes 5a and 5b are not limited in this embodiment. That is, the hole cross-sectional area of the spouting hole 5b is preferably set up about 4-6 times larger than the hole cross-sectional area of the spouting hole 5a in the chip bodies 4 according to the present embodiment. Moreover, a diameter D1 of the spouting hole 5a is set up in about 1.0-2.0 mm, and a length L1 of the longitudinal direction of the spouting hole 5b is preferably set up in about 3.0-10 mm (that is, the length L1 of the longitudinal direction of the elongated circular spouting hole 5b is about 3-5 times longer than the diameter D1 of the regular circular spouting hole 5a.).

Next, the first embodiment of a chip body (chip bodies) of the foaming nozzle 1 according to the present invention will now be explained in more detail with reference to FIG. 8 and FIGS. 9A and 9B.

Figure 8:
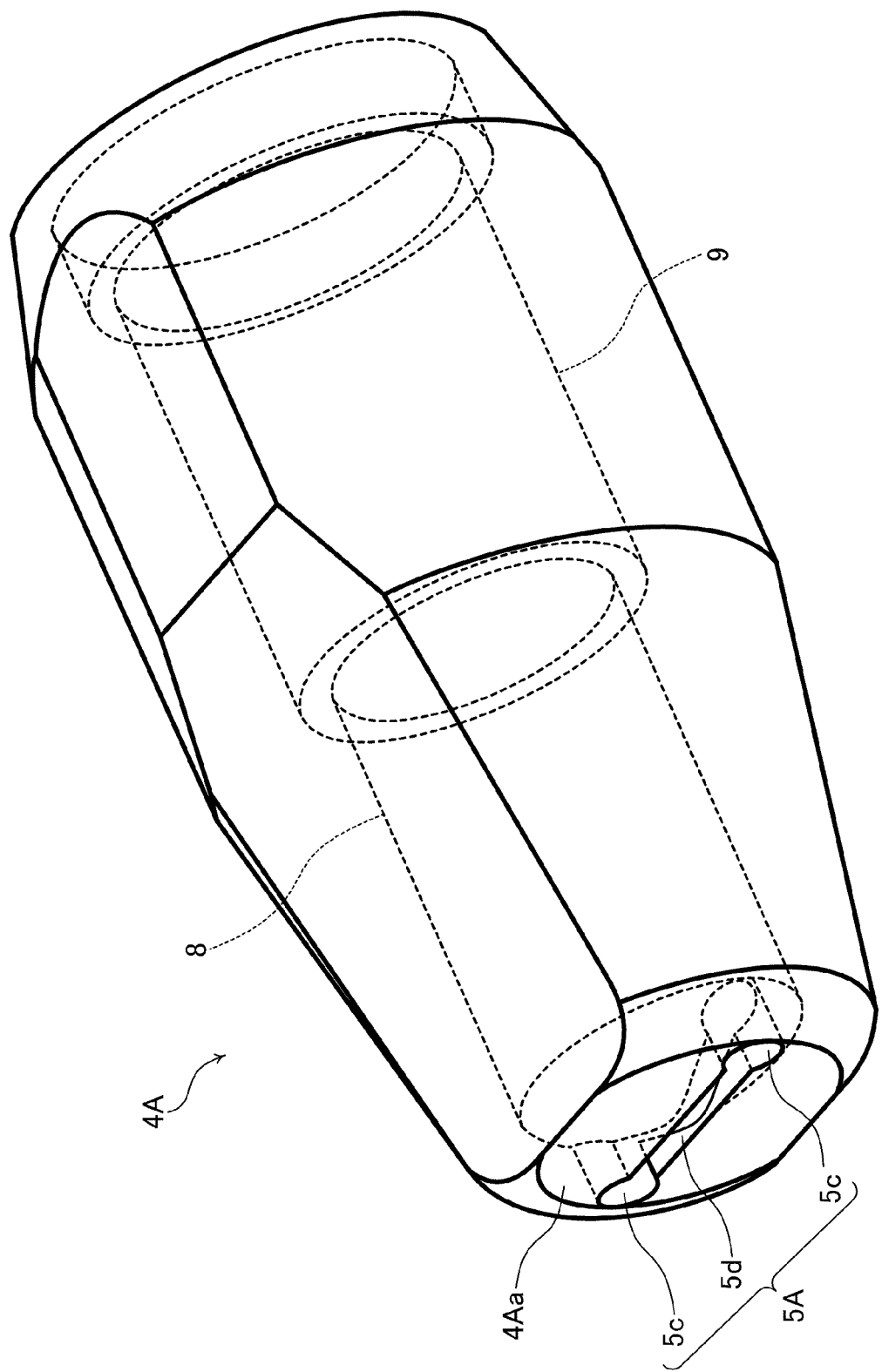
FIG. 8 is a perspective view showing the first embodiment of the chip body of the foaming nozzle according to the present invention.
Figure 9A:
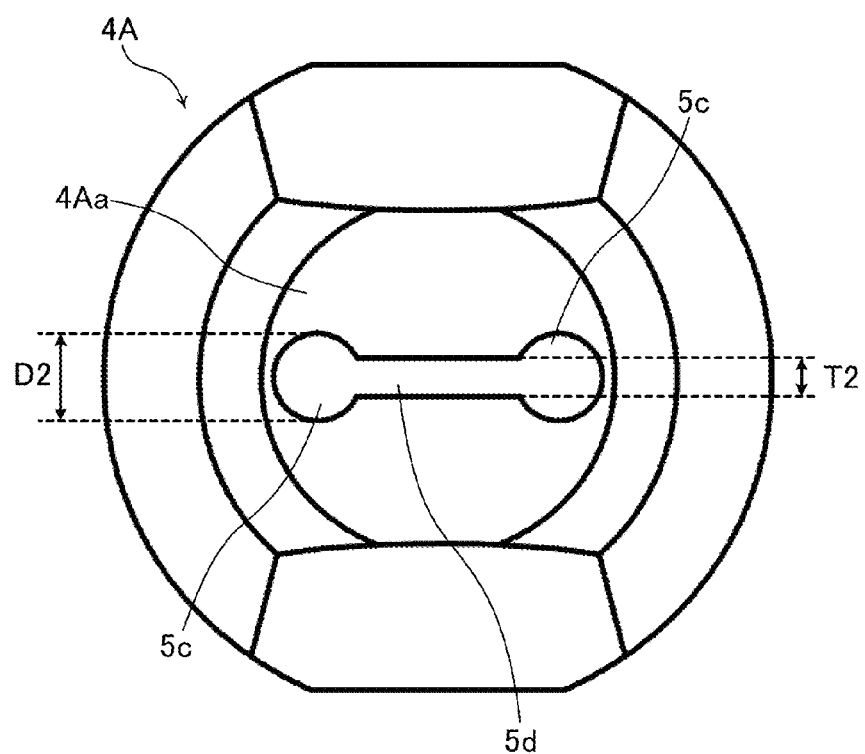
FIG. 9A is a bottom view showing the first embodiment of the chip body of the foaming nozzle according to the present invention.
Figure 9B:
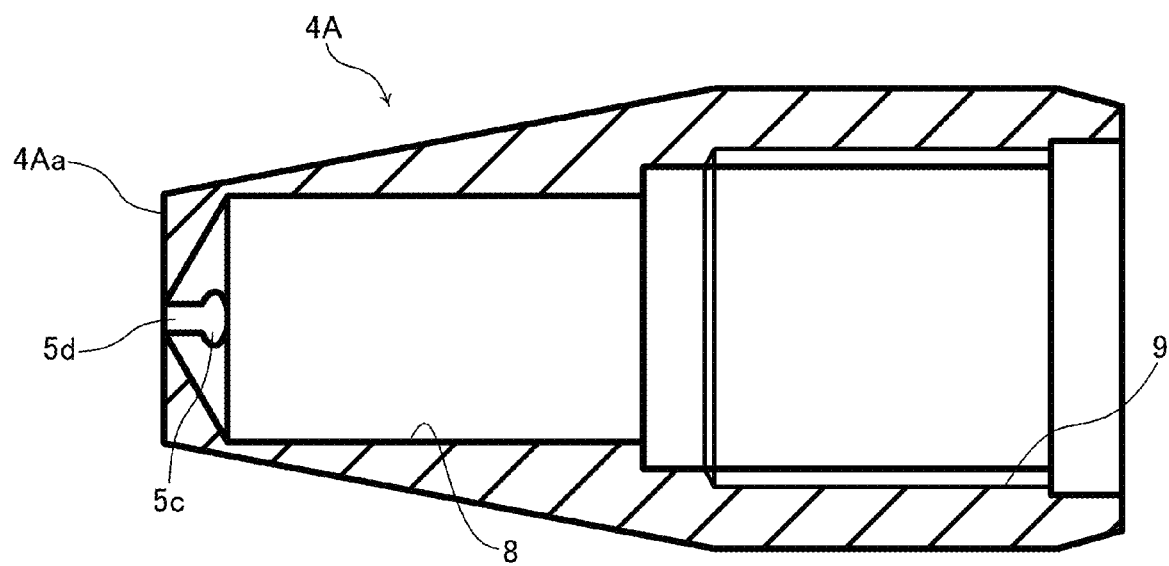
FIG. 9B is a cross-section view showing the first modification of the chip body of the foaming nozzle.

FIG. 8 shows a perspective view of the first embodiment of the chip body 4A of the foaming nozzle 1 according to the present invention, and FIGS. 9A and 9B respectively show a bottom view and a cross-sectional view of the first embodiment of the chip body of the foaming nozzle. In these figures, identical configurations and identical reference numerals with the above embodiment are given without adding explanations.

As shown in FIG. 8 and FIGS. 9A and 9B, two kinds of spouting holes 5c, 5d are integrally formed in the same plane on the bottom (tip) portion 4Aa of a chip body 4A of the first embodiment, and each of spouting holes 5c, 5d is joined with a tip of the cyrindrical hollow portion 8. Out of two kinds of the spouting holes 5c, 5d, a hole cross-section of the spouting hole 5c is formed with a regular circular, and a hole cross-section of the spouting hole 5d is formed so as to connect between the spouting holes 5c and 5d. That is, the spouting holes 5c, 5c and the spouting hole 5d joined with the connecting hole 5A integrelly formed on the bottom portion 4Aa of the chip body 4A. Further, a spouting angle between the spouting holes 5c, 5c and the spouting hole 5d is nearly in one direction as equally as the spouting angle between the spouting holes 5a and 5b, and is arranged to what a high-pressure gas spouted from the spouting hole 5c and a high-pressure gas spouted from the spouting hole 5d are joined each other and are interfered.

In the chip body 4A of the first embodiment, a thickness T2 of the spouting hole 5d is set up in about 0.5-1.0 mm, and a diameter D2 of the spouting hole 5c is preferably set up in about 1.0-2.0 mm. That is, it is necessary that the thickness T2 of the spouting hole 5d is set up smaller than the diameter D2 of the spouting hole 5c at least.

According to the foaming nozzle 1 comprising the chip body 4A made of the above structure, it is possible to obtain the same behavior and effect with the above embodiment, as well as, it is possible to more effectively generate the cavitation because the flow of a high-pressure gas, spouted from the spouting hole 5c, having a larger spouting speed is set up to interfere on both sides of the flow whose speed is the smallest by a loss with liquid in the flow of the high-pressure gas, spouted from the spouting hole 5d, having a smaller spouting speed.

Figure 10:
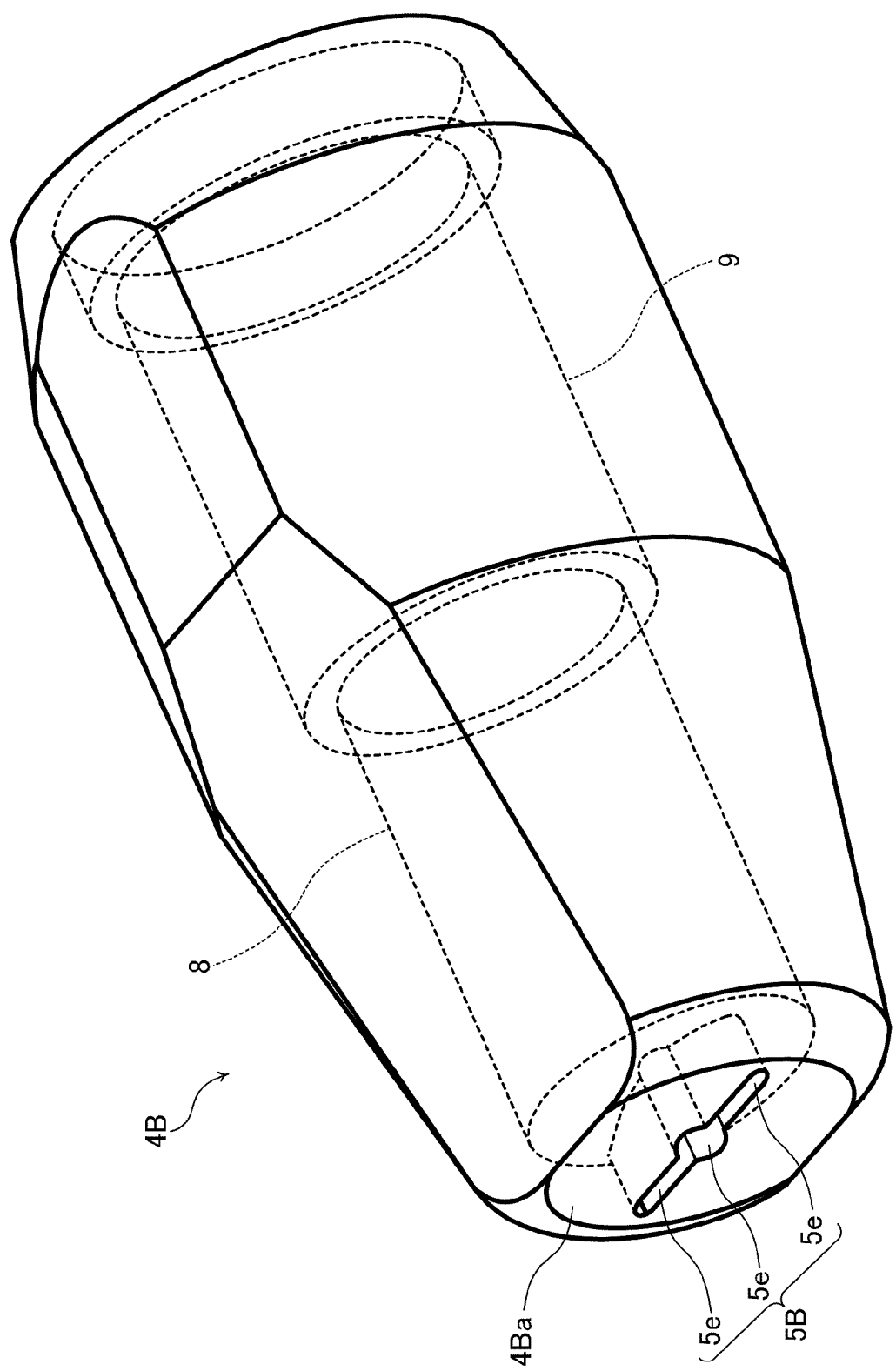
FIG. 10 is a perspective view showing the second embodiment of the chip body of the foaming nozzle according to the present invention.

Next, the second embodiment of a chip body (chip bodies) of the foaming nozzle 1 according to the present invention will now be explained in more detail with reference to FIG. 10 and FIGS. 11A and 11B. FIG. 10 shows a perspective view of the second embodiment of the chip body of the foaming nozzle according to the present invention, and FIGS. 11A and 11B respectively show a bottom view and a cross-sectional view of the second embodiment of the chip body of the foaming nozzle of the present invention. In these figures, identical configurations and identical reference numerals with the above embodiment are given without adding explanations.

Figure 11A:
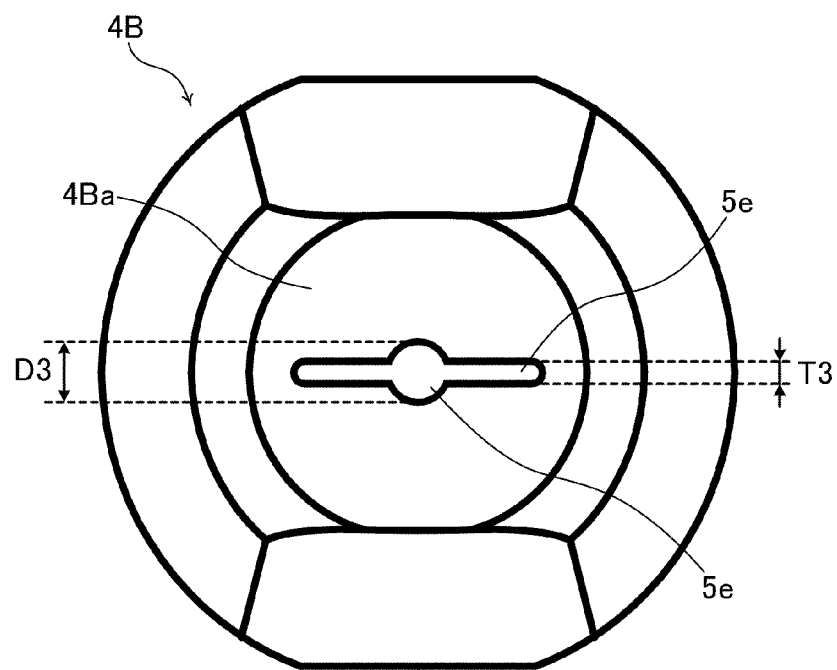
FIG. 11A is a bottom view showing the second embodiment of the chip body of the foaming nozzle according to the present invention.
Figure 11B:
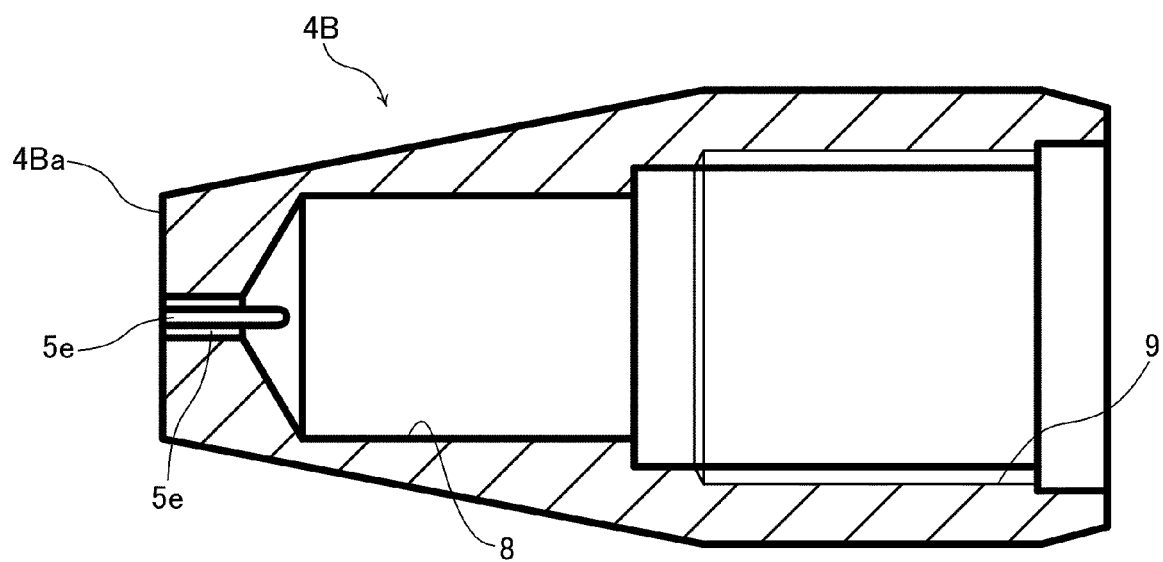
FIG. 11B is a cross-sectional view showing the second modification of the chip body of the foaming nozzle according to the present invention.

As shown in FIG. 10 and FIGS. 11A and 11B, two kinds of spouting holes 5e, 5f are integrally formed in the same plane in the bottom (tip) portion 4Ba of a chip body 4B of the second embodiment, and each of the spouting holes 5e, 5f is joined with a tip of the cyrindrical hollow portion 8. One of the two spouting holes 5e, 5f, a hole cross-section of the spouting hole 5e is formed in a regular circular, and a hole cross-section of the spouting hole 5f is formed in an elongated circular symmetrically extending to horizontal direction with a central focus on the spouting hole 5e. That is, the spouting holes 5e and 5f form a connecting hole 5B integrelly formed on a bottom portion 4Ba of the chip body 4B. Moreover, a spouting angle between the spouting holes 5e and 5f is nearly in one direction as equally as the spouting holes 5a, 5b, 5c and 5d of the above chip bodies 4 and is arranged to what a high-pressure gas spouted from the spouting hole 5e and a high-pressure gas spouted from the spouting hole 5f are joined each other and are interfered.

In the chip body 4B of the second embodiment, a thickness T3 of the spouting hole 5f is set up in about 0.5-1.0 mm, and a diameter D3 of the spouting hole 5e is preferably set up in about 1.0-2.0 mm. That is, it is necessary that the thickness T3 of the spouting hole 5f is set up smaller than the diameter D3 of the spouting hole 5e at least.

According to the foaming nozzle 1 comprising the chip body 4B made of the above structure, it is possible to obtain the same behavior and effect with the above embodiment, as well as, it is possible to more certainly generate the stable cavitation because it is possible to certainly interfere the high-pressure gas having different speed spouted from the spouting holes 5e, 5f.

Figure 12:
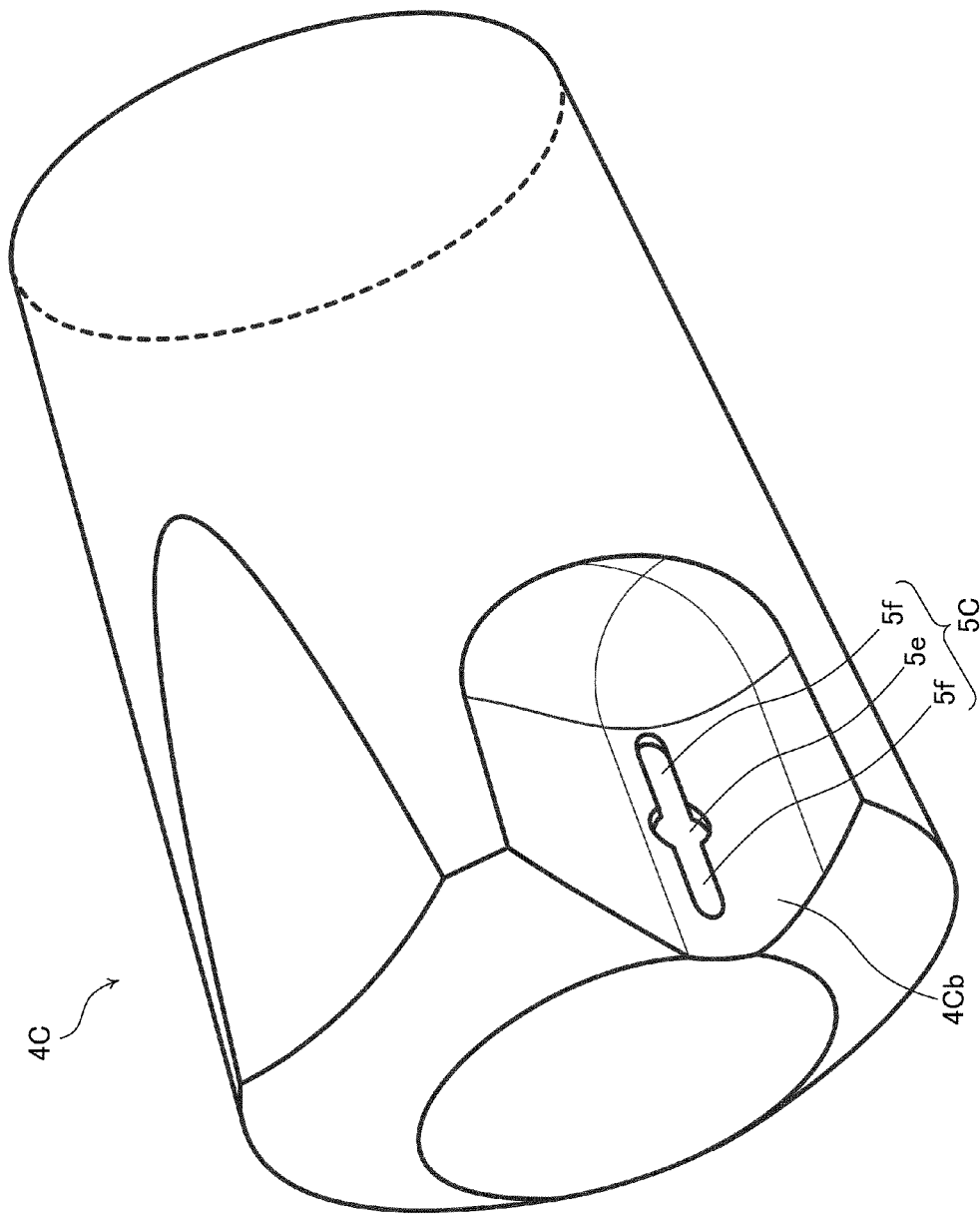
FIG. 12 is a perspective view showing the third embodiment of the chip body of the foaming nozzle according to the present invention.

Next, the third embodiment of a chip body (chip bodies) of the foaming nozzle 1 according to the present invention will now be explained in more detail with reference to FIGS. 12 to 14. FIG. 12 shows a perspective view of the third embodiment of the chip body of the foaming nozzle of the present invention, and FIGS. 13 and 14 respectively show a bottom view and a cross-sectional view of the third embodiment of the chip body of the foaming nozzle. In these figures, identical configurations and identical reference numerals with the above embodiments are given without adding explanations.

Figure 13:
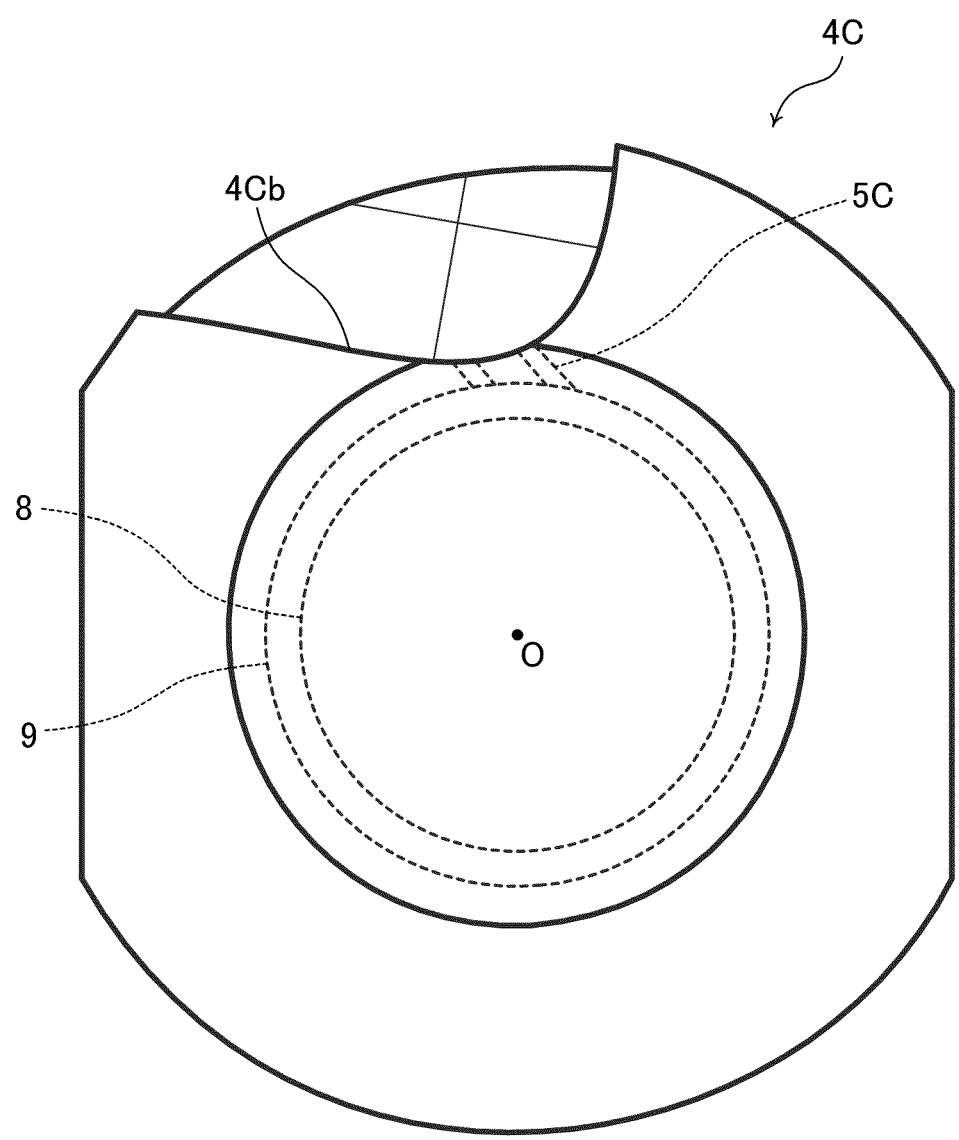
FIG. 13 is a bottom view showing the third embodiment of the chip body of the foaming nozzle according to the present invention.
Figure 14:
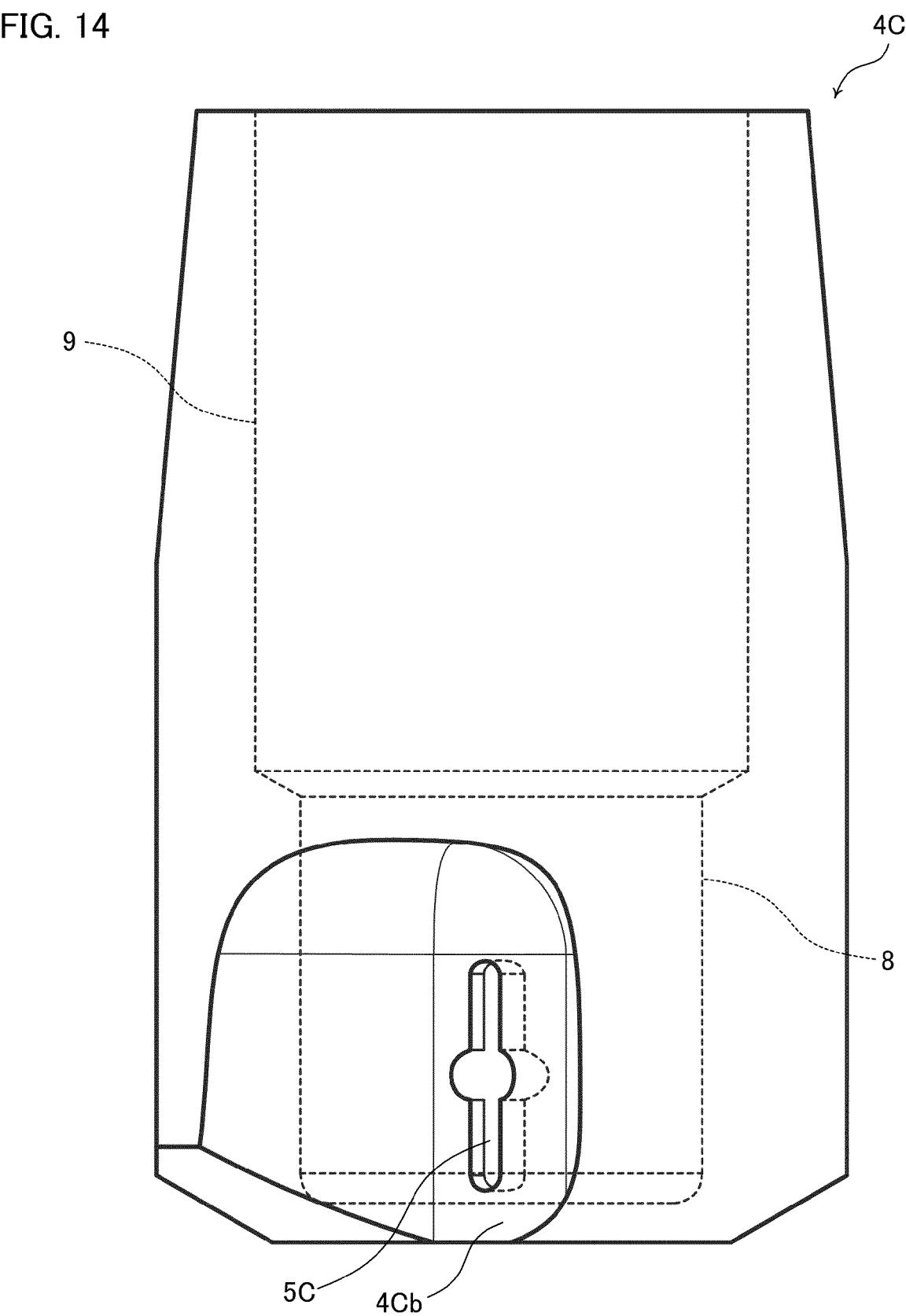
FIG. 14 is a side view showing the third embodiment of the chip body of the foaming nozzle according to the present invention.

As shown in FIGS. 12 to 14, in a tip of a chip body 4C of the third embodiment, one kind of curved section 4Cb formed by cutting-off a part of the side (of the tip of a chip body 4C) is mounted, and, in the curved section 4Cb, two kinds of the spouting holes 5e, 5f having different hole cross-sectional shapes. These spouting holes 5e and 5f are a connecting hole 5C integrelly formed, and each spouting hole is joined with the tip of the cyrindrical hollow portion 8.

In the same manner of the above second embodiment, out of two kinds of the spouting holes 5e, 5f constructing the connecting hole 5C, a hole cross-section of the spouting hole 5e is formed in a regular circular, and a hole cross-section of the spouting hole 5f is formed in an elongated circular symmetrically extending to a horizontal direction with a central focus on the spouting hole 5e. Moreover, a spouting angle between the spouting holes 5e and 5f is nearly in one direction, and is arranged to what a high-pressure gas spouted from the spouting hole 5e and a high-pressure gas spouted from the spouting hole 5f are joined each other and are interfered.

On the other hand, a spouting direction of the connecting hole 5C to the chip body 4C is mounted to slope only a predetermined angle in a circumferential direction to the radiation direction of a central axis O. The predetermined angle is preferably at the range of 30°-50°. Moreover, the radiation direction is, preferably sloping at the range of 30°-60° to the vertical direction (the direction of central axis of the chip body 4C), more preferably arranged to nearly 45°.

According to the foaming nozzle 1 comprising the chip body 4C of the third embodiment, it is possible to obtain the same behavior and effect with the above embodiments, as well as, it is possible to generate the ideal stirring to the liquid. That is, although the foaming nozzles 1 comprising the chip bodies 4, 4A and 4B of the above embodiment and the first and second embodiments generate the flow stirring the liquid 7 in container 6 by spouting, while inclining the container 6, the high-pressure gas, the foaming nozzle 1 comprising the chip body 4C can generate the flow stirring the liquid 7 (in the container 6) without inclining the container 6. Therefore, it is possible, if unskilled person, to easily produce good foam.

Figure 15:
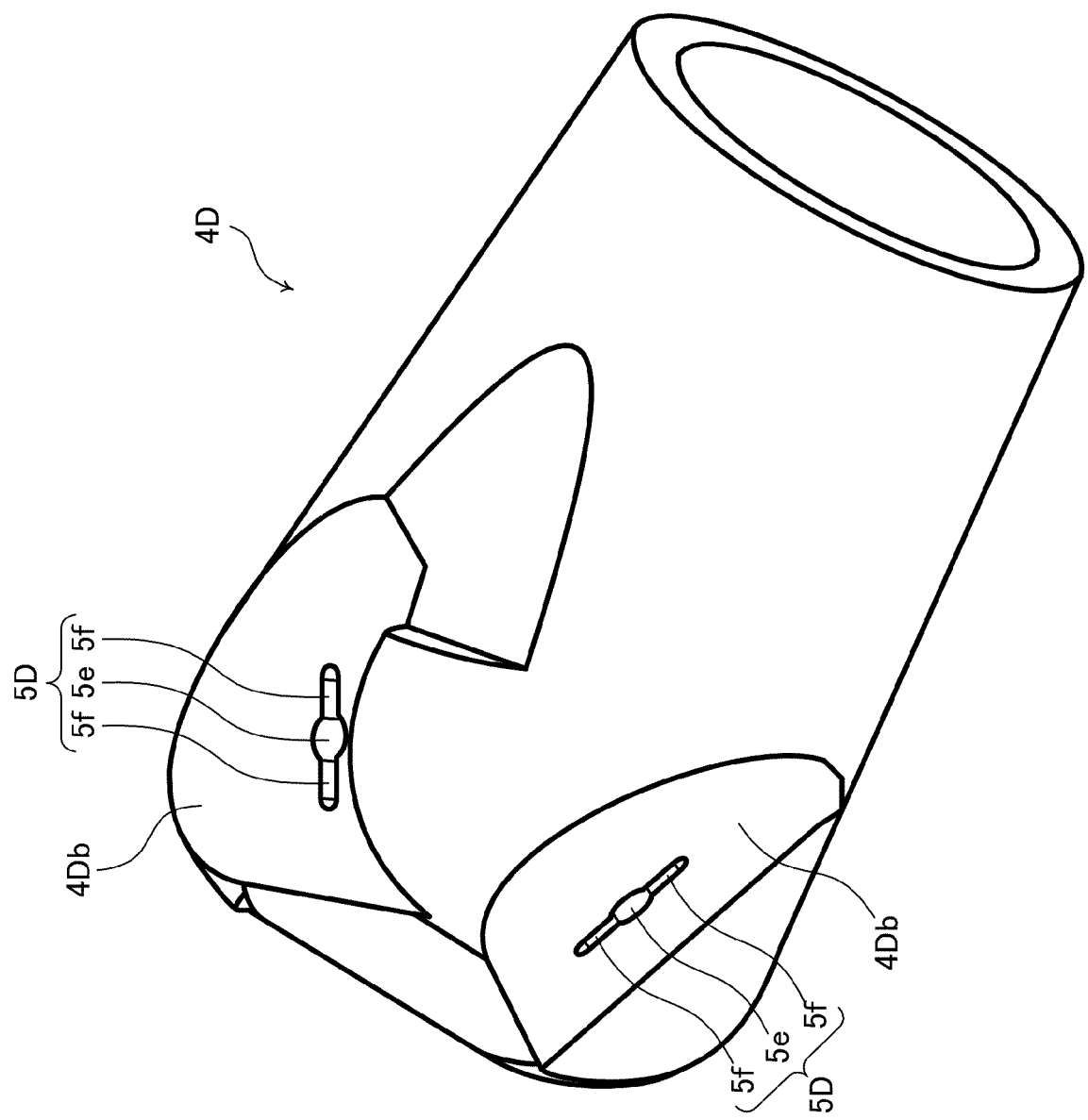
FIG. 15 is a perspective view showing the fourth embodiment of the chip body of the foaming nozzle according to the present invention.
Figure 16:
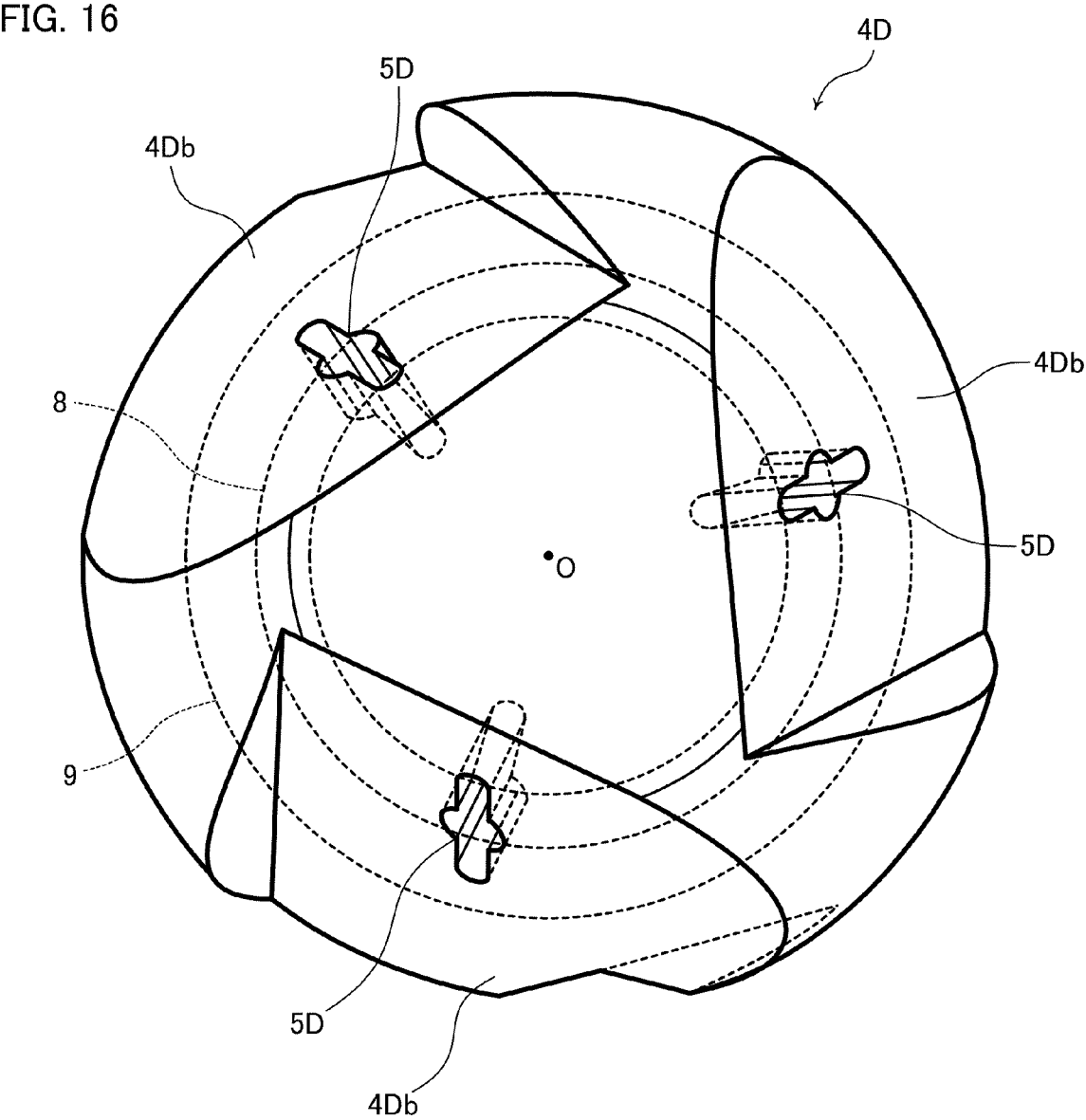
FIG. 16 is a bottom view showing the fourth embodiment of the chip body of the foaming nozzle according to the present invention.
Figure 17:
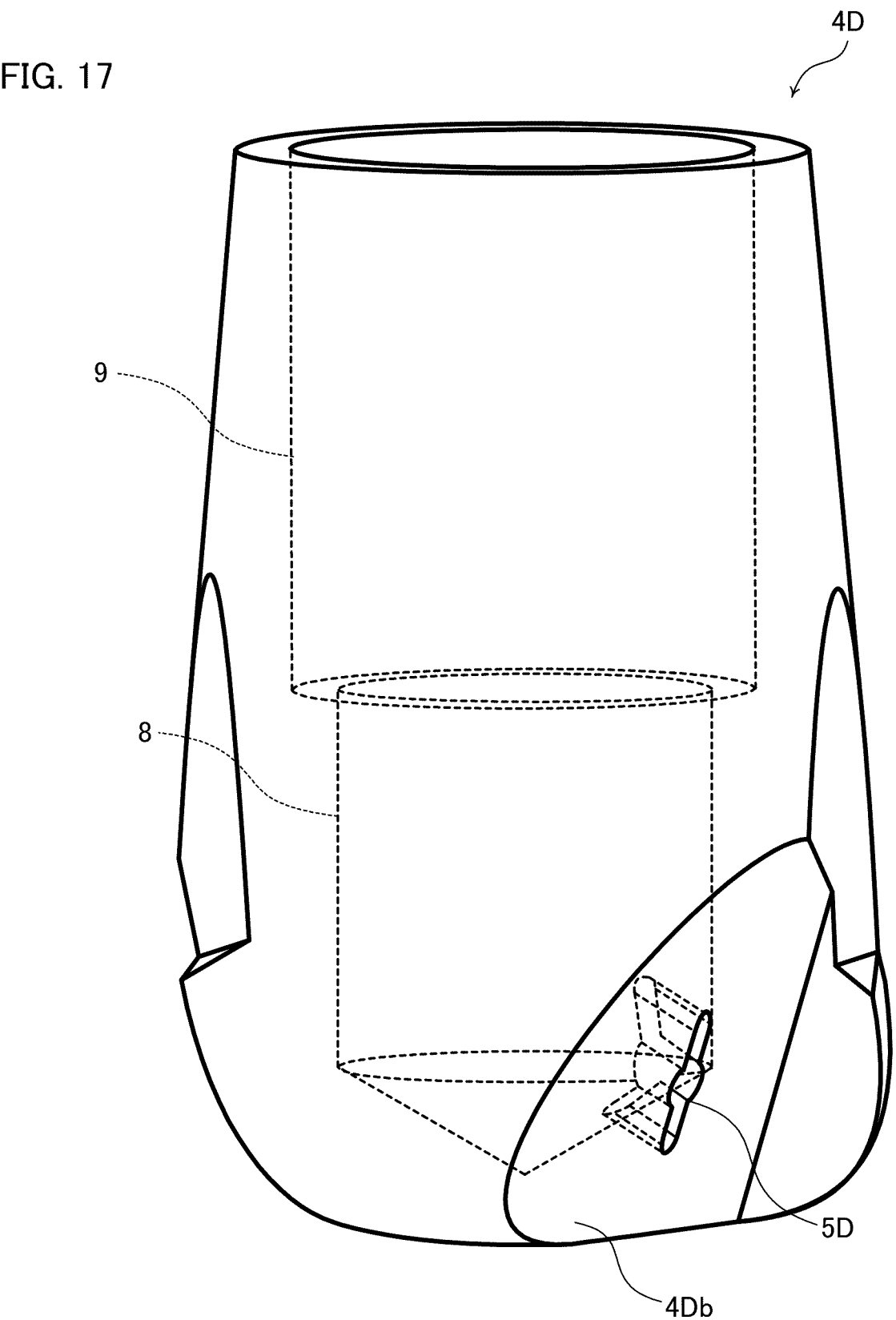
FIG. 17 is a side view showing the fourth embodiment of the chip body of the foaming nozzle according to the present invention.
Figure 18:
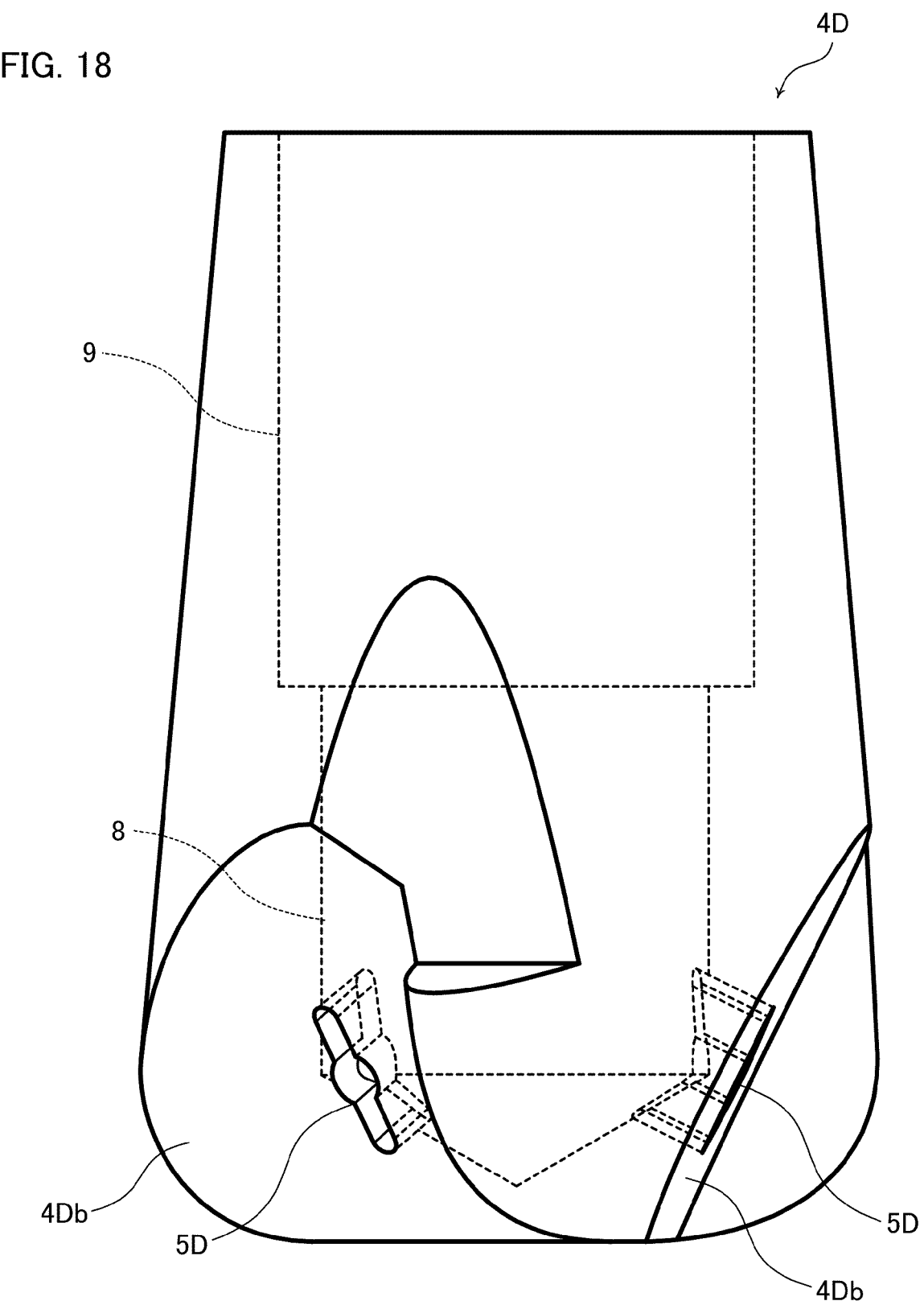
FIG. 18 is a side view showing the fourth embodiment of the chip body of the foaming nozzle of the present invention, and the side view in FIG. 18 is showing at a variant angle of the side view in FIG. 17.

Next, the fourth embodiment of a chip body (chip bodies) of the foaming nozzle 1 according to the present invention will now be explained in more detail with reference to FIGS. 15 to 18. FIG. 15 shows a perspective view of the fourth embodiment of the chip body of the foaming nozzle, and FIG. 16 shows a bottom view of the fourth embodiment of the chip body of foaming nozzle. Moreover, FIGS. 17 and 18 show side views of the chip bodies of the fourth embodiment when seeing each chip body from a different angle. In these figures, identical configurations and identical reference numerals with the above embodiments are given without adding explanations.

In the tip of the chip body 4D of the fifth embodiment, as shown in FIG. 16, three sloped sections 4Db cut at a predetermined inclination angle are formed, and two kinds of the spouting holes 5e, 5f having different hole cross-section shapes are formed in each sloped sectional 4Db. These spouting holes 5e and 5f are a connecting hole 5D integrelly formed, and each spouting hole is joined with the tip of the cyrindrical hollow portion 8.

In the same manner of the above second embodiment, out of two kinds of the spouting holes 5e, 5f constructing the connecting hole 5D, a hole cross-section of the spouting hole 5e is formed in a regular circular, and a hole cross-section of the spouting hole 5f is formed in an elongated circular symmetrically extending to a horizontal direction with a central focus on the spouting hole 5e. Moreover, a spouting angle between the spouting holes 5e and 5f is nearly in one direction, and is arranged to what a high-pressure gas spouted from the spouting hole 5e and a high-pressure gas spouted from the spouting hole 5f are joined each other and are interfered.

On the other hand, a spouting direction of the connecting hole 5D to the chip body 4D is mounted to slope only a predetermined angle in a circumferential direction to the radiation direction of each central axis O, and each high-pressure gas cannot interfere each other. The predetermined angle is preferably at the range of 30°-50°. Moreover, the radiation direction is, preferably sloping at the range of 30°-60° to the vertical direction (the direction of central axis of chip body 4D), more preferably arranged to nearly 45°.

According to the foaming nozzle 1 comprising the chip body 4D of the fourth embodiment, it is possible to obtain the same behavior and effect with the above embodiments, as well as, it is possible to stir the liquid 7 in the container 6 more effectively than the chip body 4C of the third embodiment, because a plurality of the connecting holes 5D that can provide the stirring behavior to the liquid 7 in container 6 are formed at a predetermined distance along the circumferential direction of the tip of the chip body 4D.

Figure 19:
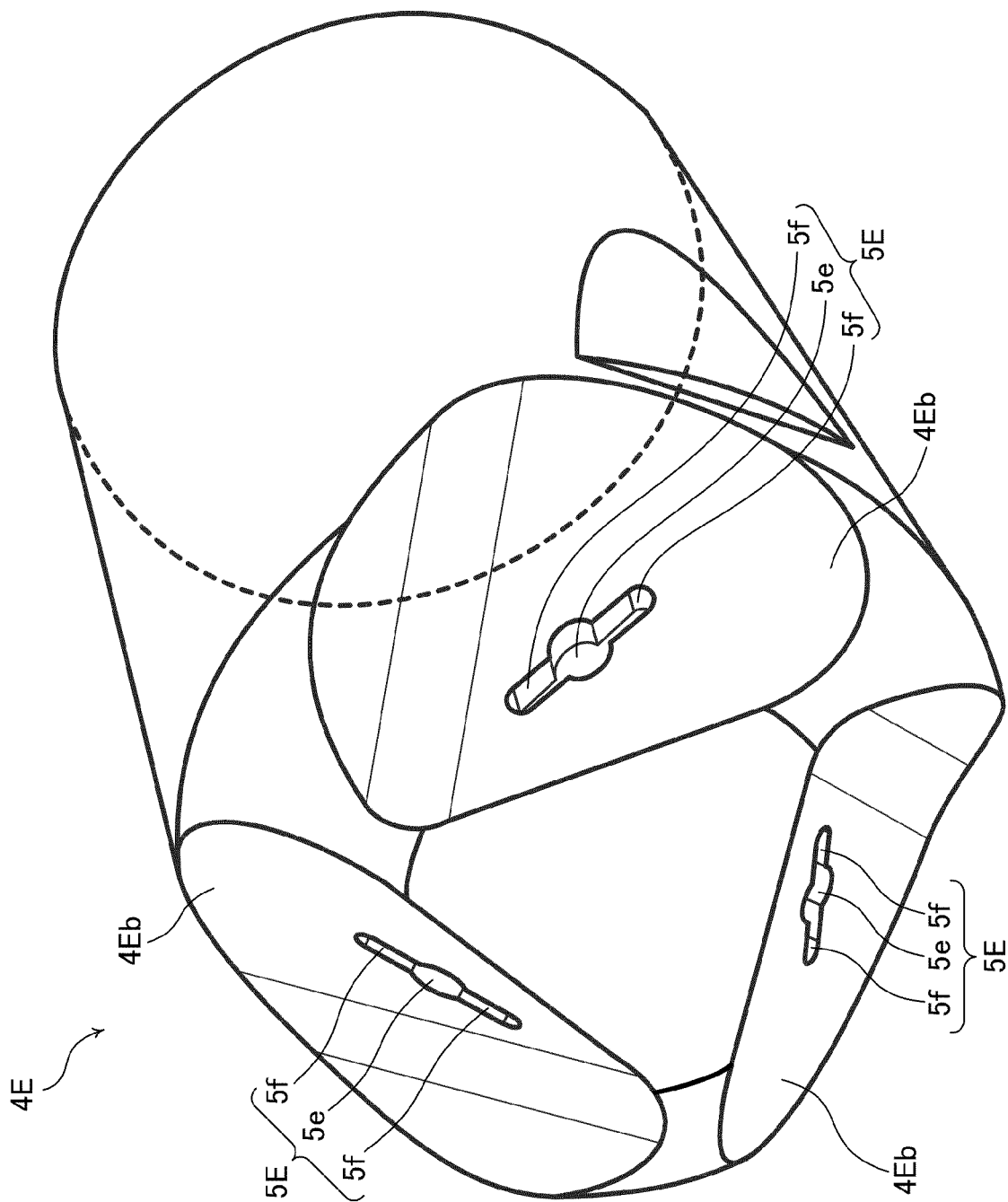
FIG. 19 is a perspective view showing the fifth embodiment of the chip body of the foaming nozzle according to the present invention.
Figure 20:
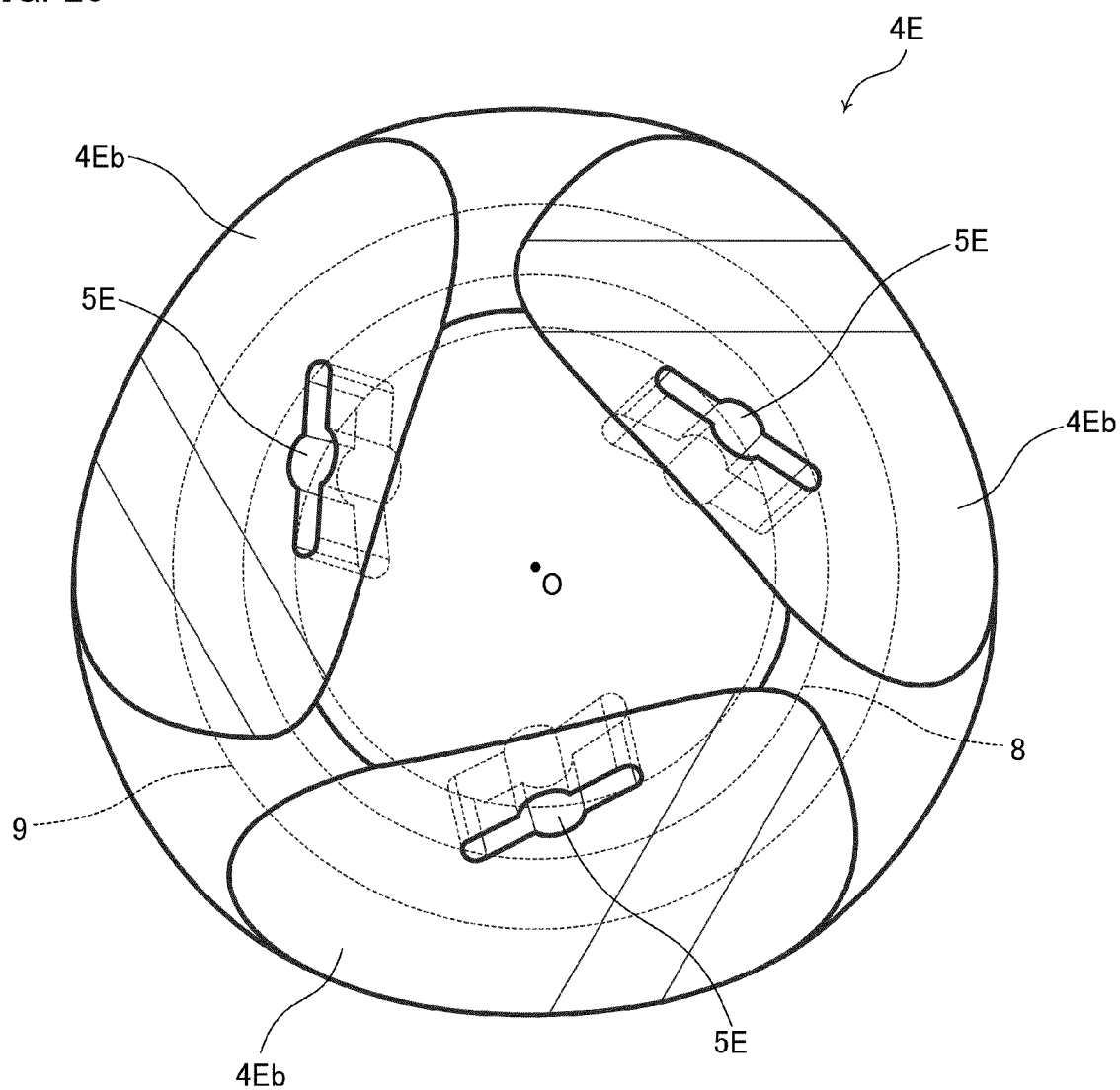
FIG. 20 is a bottom view showing the fifth embodiment of the chip body of the foaming nozzle according to the present invention.
Figure 21:
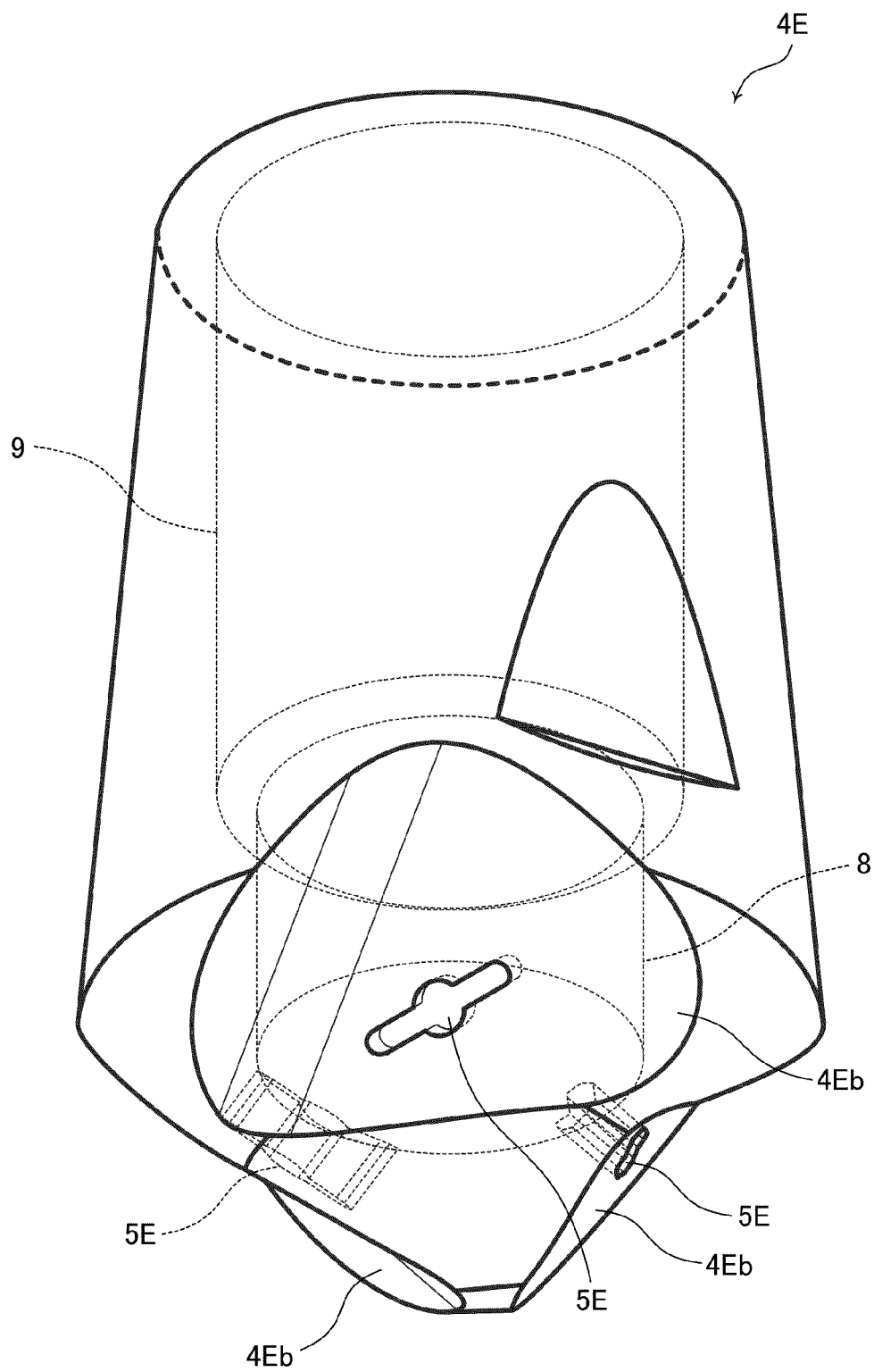
FIG. 21 is a side view showing the fifth embodiment of the chip body of the foaming nozzle according to the present invention.
Figure 22:
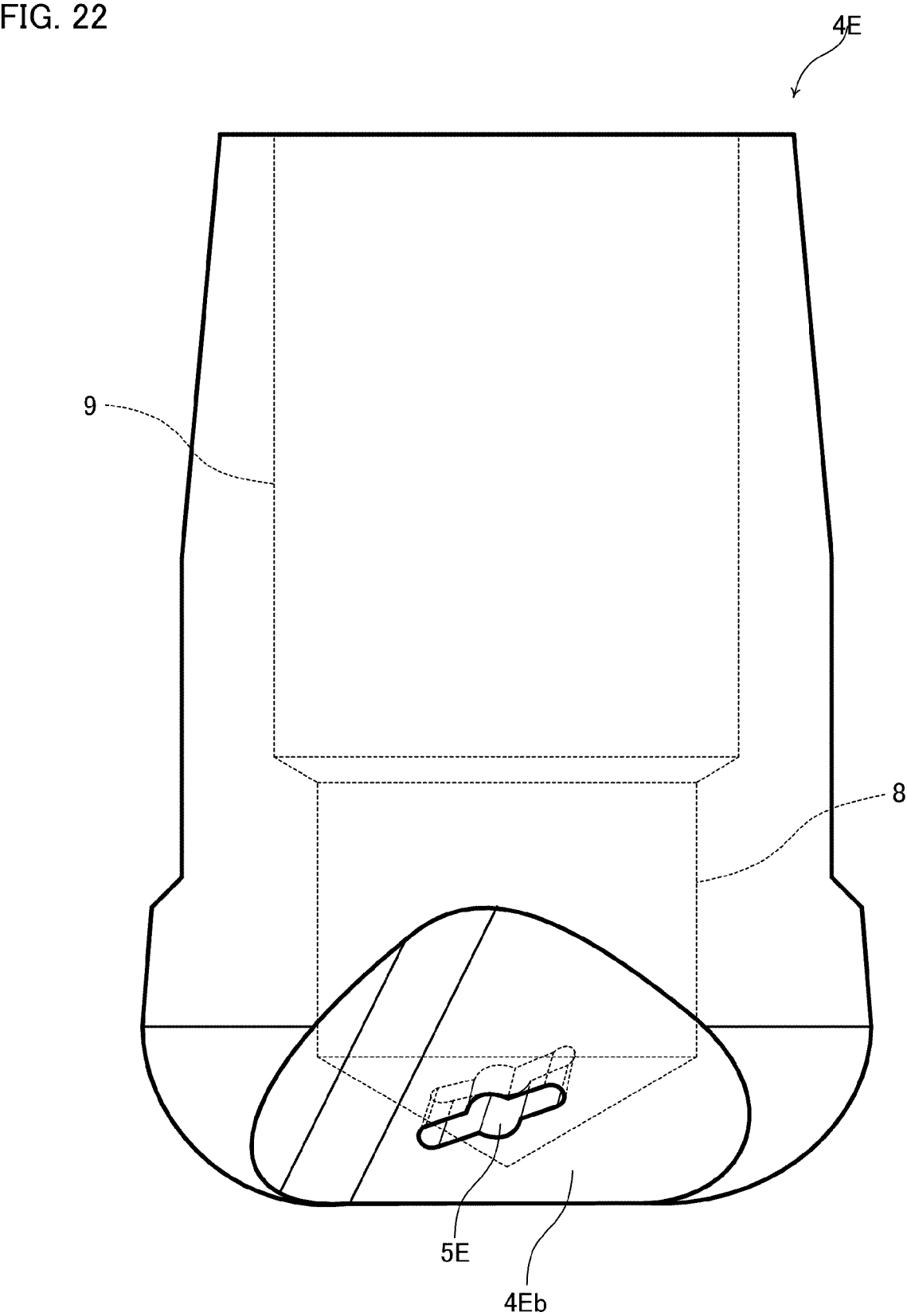
FIG. 22 is a side view showing the fifth embodiment of the chip body of the foaming nozzle according to the present invention, and the side view in FIG. 22 is showing at a variant angle of the side view in FIG. 21.

Next, the fifth embodiment of a chip body (chip bodies) of the foaming nozzle 1 according to the present invention will now be explained in more detail with reference to FIGS. 19 to 22. FIG. 19 shows a perspective view of the fifth embodiment of the chip body of the foaming nozzle, and FIG. 20 shows a bottom view of the chip body of the fifth embodiment. Moreover, FIGS. 21 and 22 show side views of the chip bodies of the fifth embodiment when seeing each chip body from a different angle. In these figures, identical configurations and identical reference numerals with the above embodiments are given without adding explanations.

In the tip of chip body 4E of the fifth embodiment, as shown in FIG. 20, three sloped sections 4Eb cut at a predetermined inclination angle are formed, and two kinds of the spouting holes 5e, 5f having different hole cross-sectional shapes are formed in each sloped section 4Eb. These spouting holes 5e and 5f are a connecting hole 5E integrelly formed, and each spouting hole is joined with the tip of the cyrindrical hollow portion 8.

In the same manner of the above second embodiment, out of two kinds of the spouting holes 5e, 5f constructing the connecting hole 5E, a hole cross-section of the spouting hole 5e is formed in a regular circular, and a hole cross-section of the spouting hole 5f is formed in an elongated circular symmetrically extending to a horizontal direction with a central focus on the spouting hole 5e. Moreover, a spouting angle between the spouting holes 5e and 5f is nearly in one direction, and is arranged to what a high-pressure gas spouted from the spouting hole 5e and a high-pressure gas spouted from the spouting hole 5f are joined each other and are interfered.

On the other hand, a spouting direction of the connecting hole 5E to the chip body 4E is mounted to slope only a predetermined angle in a circumferential direction to the radiation direction of each central axis O, and each high-pressure gas cannot interfere each other. The predetermined angle is preferably at the range of 30°-50°. Moreover, the radiation direction is, preferably sloping at the range of 30°-60° to the vertical direction (the direction of central axis of the chip body 4E), more preferably arranged to nearly 45°.

According to the foaming nozzle 1 comprising the chip body 4E of the fifth embodiment, it is possible to obtain the same behavior and effect with the above first, second, third and fourth embodiments.

Figure 23:
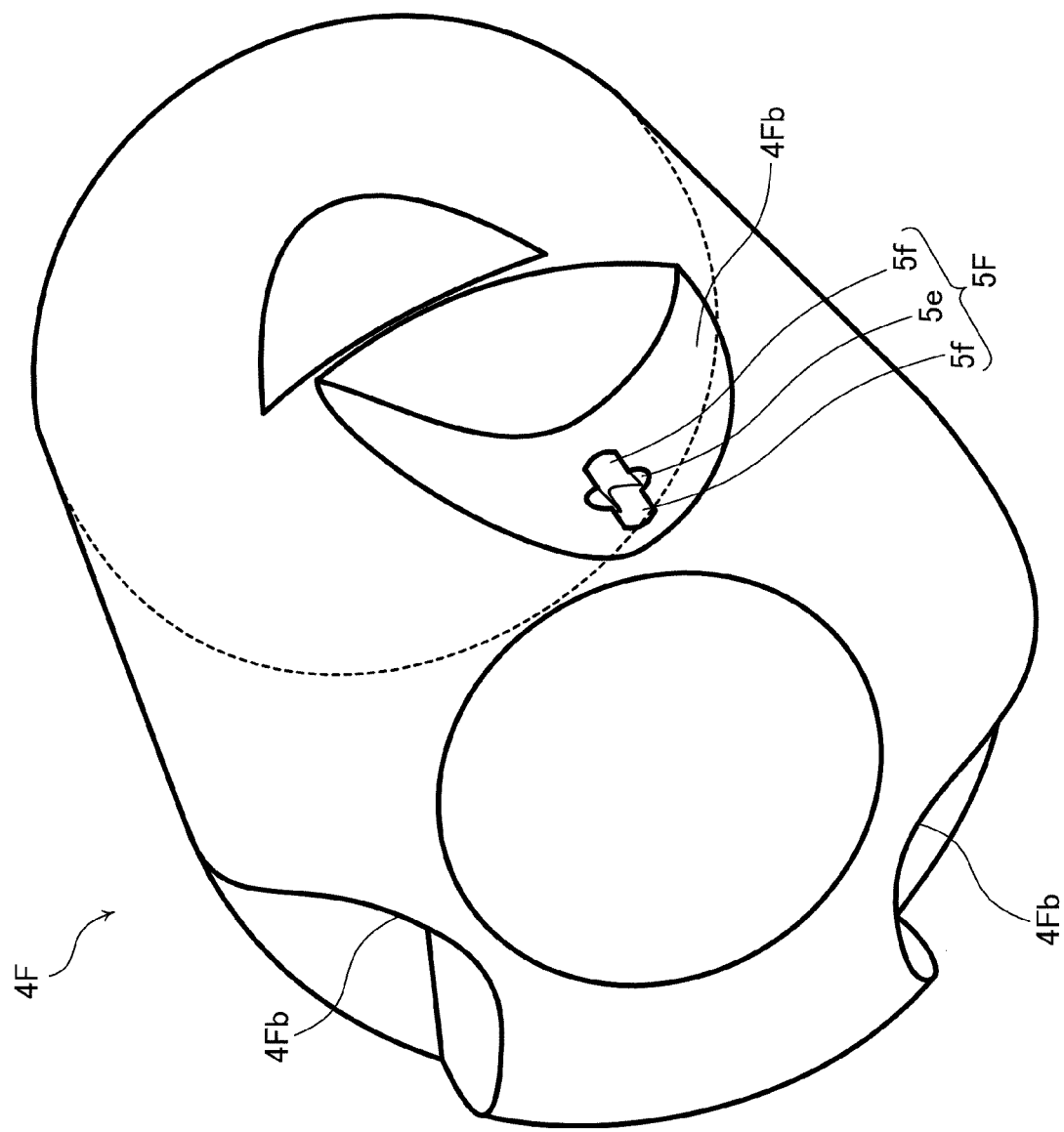
FIG. 23 is a perspective view showing the sixth embodiment of the chip body of the foaming nozzle according to the present invention.

Finally, the sixth embodiment of a chip body (chip bodies) of the foaming nozzle 1 according to the present invention will now be explained in more detail with reference to FIGS. 23 to 25. FIG. 23 shows a perspective view of the sixth embodiment of the chip body of the foaming nozzle, and FIGS. 24 and 25 respectively show a bottom view and a side view of the chip body of the sixth embodiment. In these figures, identical configurations and identical reference numerals with the above embodiments are given without adding explanations.

Figure 24:
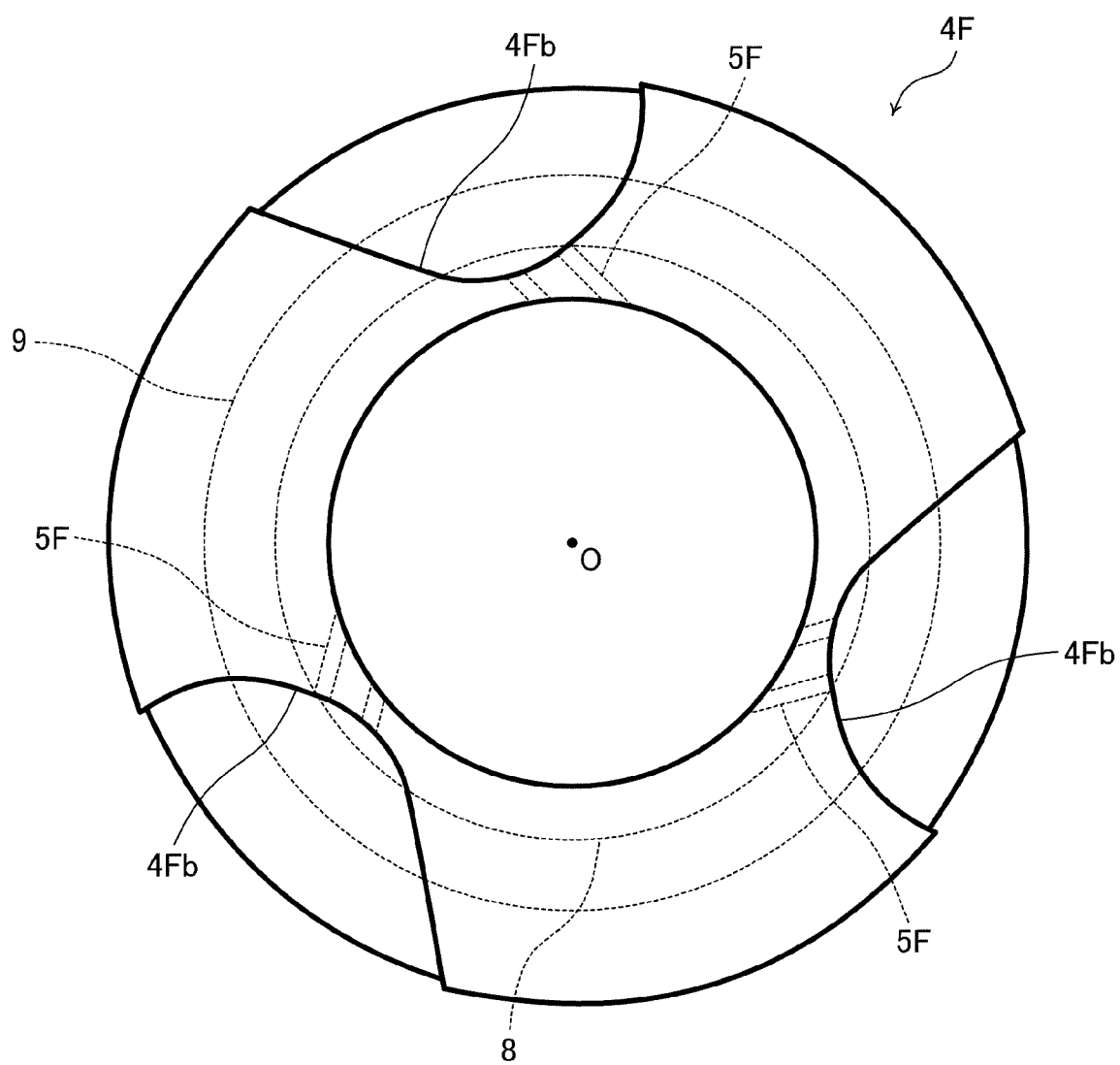
FIG. 24 is a bottom view showing the sixth embodiment of the chip body of the foaming nozzle according to the present invention.
Figure 25:
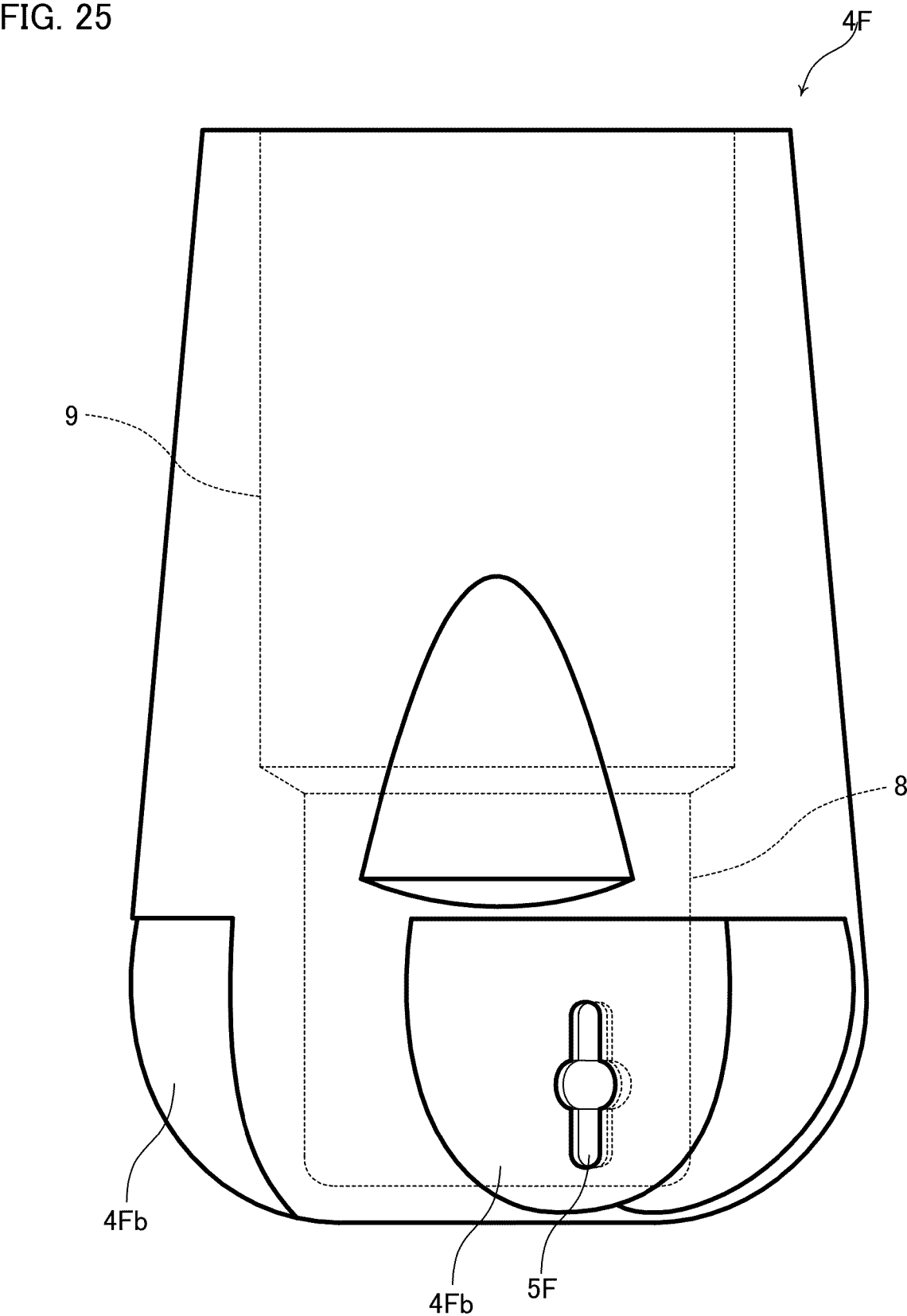
FIG. 25 is a side view showing the sixth embodiment of the chip body of the foaming nozzle according to the present invention.

In the tip of the chip body 4F of the sixth embodiment, as shown in FIG. 24, three curved sections 4Fb cut at a predetermined inclination angle are formed, and two kinds of the spouting holes 5e, 5f having different hole cross-sectional shapes are formed in the curved sections 4Fb. These spouting holes 5e and 5f are the connecting hole 5E integrelly formed, and each spouting hole is joined with the tip of the cyrindrical hollow portion 8.

In the same manner of the above second embodiment, out of two kinds of the spouting holes 5e, 5f constructing a connecting hole 5F, a hole cross-section of the spouting hole 5e is formed in a regular circular, and a hole cross-section of the spouting hole 5f is formed in an elongated circular symmetrically extending to a horizontal direction with a central focus on the spouting hole 5e. Moreover, a spouting angle between the spouting holes 5e and 5f is nearly in one direction, and is arranged to what a high-pressure gas spouted from the spouting hole 5e and a high-pressure gas spouted from the spouting hole 5f are joined each other and are interfered.

On the other hand, a spouting direction of the connecting hole 5F to the chip body 4F is mounted to slope only a predetermined angle in a circumferential direction to the radiation direction of each central axis O, and each high-pressure gas cannot interfere each other. The predetermined angle is preferably at the range of 30°-50°. Moreover, the radiation direction is, preferably sloping at the range of 30°-60° to the vertical direction (the direction of central axis of the chip body 4F), more preferably arranged to nearly 45°.

According to the foaming nozzle 1 comprising the chip body 4F of the sixth embodiment, it is possible to obtain the same behavior and effect with the above first, second, third, fourth and fifth embodiments.

Although, in each of the chip bodies 4c-4F shown in FIGS. 12 to 25, the spouting holes 5e, 5f of the above second embodiment and the connecting holes 5C to 5F having the same shape of the spouting holes are formed on each of curved section 4Cb, 4Fb and each of sloped section 4Db, 4Eb, the present invention is not restricted, for example, the spouting holes 5a and 5b of the embodiment or the spouting holes 5c and 5d of the first modification had better be formed on each of curved section 4Cb, 4Fb and each of the sloped section 4Db, 4Eb.

Moreover, although, in the chip bodies 4D to 4F of the fourth, fifth and sixth embodiments, two sloped sections 4Db, 4Eb or three curved sections 4Fb on which the connecting holes 5D to 5F (the spouting holes 5e, 5f) are located at 120° distance along the circumferential direction of the tip by counting the process cost and the stirring performance, the present invention is not restricted, for example, these locations may be four at 90° distance or two at 180° distance along the circumferential direction of the tip of the chip bodies 4D-4F.

As described above, although the description explains the details of the embodiment and the modifications of the present invention, the present invention is not restricted these embodiments, for example, the spouting holes formed on the bottom 4a of the chip body 4 are more than three kinds, and it is possible to arbitrarily change without departing from the scope of the present invention.

Further, in the above embodiments, although each of the spouting holes is formed in the chip body 4 detachable attached in the tip of the foaming nozzle 1, the present invention is not restricted these embodiments, for example, the present invention has the structure that the chip body 4 has been integrated by foaming nozzle 1, that is, the structure is that the spouting holes are directly formed in the tip of the foaming nozzle 1 being closure.

Moreover, the present invention may have applicability to the case of emulsifying the fresh cream etc. as the target liquid of foaming. In this case, it is possible to achieve the high-quality emulsification at a short time by spouting a low temperature high-pressure gas (air) to the raw materials of the fresh cream having the over 40% milk constituent as the target liquid from the foaming nozzle 1 while generating the high-pressure gas (high-pressure air) cooled lower than normal temperature by the high-pressure gas generating device 2.

EXPLANATION OF REFERENCE NUMERALS 1 foaming nozzle
2 high-pressure gas generating device (coffee extruction machine)
3 flow passageway
4A-4F tip body (chip bodies)
4a, 4Aa-4Fa bottom portion
4Cb, 4Fb curved section
4Db, 4Eb sloped section
5a-5f spouting hole
5A-5F connecting hole
6 container (milk pitcher)
7 liquid (milk)
8 cyrindrical hollow portion
9 pararel screw portion
Ga, Gb high-pressure gas (high-temperature steam)

The invention claimed is:

1. A foaming nozzle, which is connected to a gas generating device for generating a high-pressure gas which has a pressure higher than an atmospheric pressure, and foams, while stirring, a liquid located in a spouting direction by spouting the high-pressure gas from a tip, wherein a set of spouting holes including at least two kinds of spouting holes for spouting the high-pressure gas are formed in parallel in said tip, at least one kind of said at least two kinds of spouting holes is formed in a shape different from a shape of another kind of said at least two kinds of spouting holes so as to spout the high-pressure gas at a speed different from a speed of the high-pressure gas spouted from said other kind of said at least two kinds of spouting holes, flows of the high-pressure gas, having different speeds, in parallel spouted from said at least two kinds of spouting holes are adapted to interfere with each other in the liquid, and a hole cross-section of at least one kind of said at least two kinds spouting holes is a precise circular shape and a hole cross-section of another of said at least two kinds of spouting holes is an elongated circular shape having a larger cross-sectional area than the precise circular shape.

2. A foaming nozzle according to claim 1, wherein at least one kind of said at least two kinds of spouting holes and another kind of said at least two kinds of spouting holes are different holes which are separated and are formed on a same plane of said tip.

3. A foaming nozzle according to claim 1, wherein a plurality of working surfaces are regularly formed along a circumferential direction in a side surface of said tip, said set of spouting holes is form in each of said working surfaces, and a spouting direction of any of said sets of spouting holes formed in said working surfaces is arranged without interference to the high-pressure gas spouted from any other of said sets of spouting holes formed in said working surfaces.

4. A foaming nozzle according to claim 3, wherein said sets of spouting holes formed in said working surfaces are formed at 120° intervals along a circumferential direction of said tip.

5. A foaming nozzle according to claim 4, wherein the gas generating device extracts coffee by applying a pressure higher than an atmospheric pressure and generates a high-temperature steam as the high-pressure gas, and the liquid is a milk foamed and heated by the high-temperature steam.

6. A foaming nozzle, which is connected to a gas generating device for generating a high-pressure gas which has a pressure higher than an atmospheric pressure, and foams, while stirring, a liquid located in a spouting direction by spouting the high-pressure gas from a tip, wherein
- a set of spouting holes including at least two kinds of spouting holes for spouting the high-pressure gas are formed in parallel in said tip,
- at least one kind of said at least two kinds of spouting holes is formed in a shape different from a shape of another kind of said at least two kinds of spouting holes so as to spout the high-pressure gas at a speed different from a speed of the high-pressure gas spouted from said other kind of said at least two kinds of spouting holes,
- flows of the high-pressure gas, having different speeds, in parallel spouted from said at least two kinds of spouting holes are adapted to interfere with each other in the liquid,
- said at least two kinds of spouting holes are formed in a bottom of a chip body detachably attached to said tip, and
- a hole cross-section of at least one kind of said at least two kinds spouting holes is a precise circular shape and a hole cross-section of another of said at least two kinds of spouting holes is an elongated circular shape having a larger cross-sectional area than the precise circular shape.

7. A foaming nozzle, which is connected to a gas generating device for generating a high-pressure gas which has a pressure higher than an atmospheric pressure, and foams, while stirring, a liquid located in a spouting direction by spouting the high-pressure gas from a tip, wherein
- a set of spouting holes including at least two kinds of spouting holes for spouting the high-pressure gas are formed in parallel in said tip,
- at least one kind of said at least two kinds of spouting holes is formed in a shape different from a shape of another kind of said at least two kinds of spouting holes so as to spout the high-pressure gas at a speed different from a speed of the high-pressure gas spouted from said other kind of said at least two kinds of spouting holes,
- flows of the high-pressure gas, having different speeds, in parallel spouted from said at least two kinds of spouting holes are adapted to interfere with each other in the liquid, and
- a plurality of working surfaces are formed in a side surface of said tip and said set of spouting holes is formed in each of said working surfaces.

8. A foaming nozzle, which is connected to a gas generating device for generating a high-pressure gas which has a pressure higher than an atmospheric pressure, and foams, while stirring, a liquid located in a spouting direction by spouting the high-pressure gas from a tip, wherein
- a set of spouting holes including at least two kinds of spouting holes for spouting the high-pressure gas are formed in parallel in said tip,
- at least one kind of said at least two kinds of spouting holes is formed in a shape different from a shape of another kind of said at least two kinds of spouting holes so as to spout the high-pressure gas at a speed different from a speed of the high-pressure gas spouted from said other kind of said at least two kinds of spouting holes,
- flows of the high-pressure gas, having different speeds, in parallel spouted from said at least two kinds of spouting holes are adapted to interfere with each other in the liquid, and
- a plurality of working surfaces are regularly formed along a circumferential direction in a side surface of said tip, said set of spouting holes is form in each of said working surfaces, and a spouting direction of any of said sets of spouting holes formed in said working surfaces is arranged without interference to the high-pressure gas spouted from any other of said sets of spouting holes formed in said working surfaces.

9. A foaming nozzle according to claim 8, wherein the spouting directions of said sets of spouting holes formed in said working surfaces are arranged in order to slant in a circumferential direction at a predetermined angle relative to each radiation direction.

10. A foaming nozzle according to claim 9, wherein the radiation direction is arranged to slant in a range of 30°-60° relative to a vertical direction, and the predetermined angle is in a range of 30°-50°.

* * * * *